(12) United States Patent
Fukuhara et al.

(10) Patent No.: US 8,098,947 B2
(45) Date of Patent: Jan. 17, 2012

(54) METHOD AND APPARATUS FOR PROCESSING IMAGE DATA BY REARRANGING WAVELET TRANSFORM DATA

(75) Inventors: Takahiro Fukuhara, Kanagawa (JP); Naoto Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 902 days.

(21) Appl. No.: 12/109,887

(22) Filed: Apr. 25, 2008

(65) Prior Publication Data

US 2008/0285874 A1 Nov. 20, 2008

(30) Foreign Application Priority Data

May 17, 2007 (JP) ................................. 2007-132094

(51) Int. Cl.
*G06K 9/00* (2006.01)
(52) U.S. Cl. ...................................... 382/239; 382/260
(58) Field of Classification Search .................. 382/239, 382/260
See application file for complete search history.

(56) References Cited

U.S. PATENT DOCUMENTS

| 6,560,369 | B1 * | 5/2003 | Sato .............................. | 382/239 |
|---|---|---|---|---|
| 2001/0016077 | A1 * | 8/2001 | Oki ............................... | 382/240 |
| 2001/0028747 | A1 * | 10/2001 | Sato et al. ...................... | 382/239 |
| 2001/0028748 | A1 * | 10/2001 | Sato et al. ...................... | 382/239 |
| 2007/0071332 | A1 | 3/2007 | Katayama | |
| 2007/0269122 | A1 | 11/2007 | Fukuhara et al. | |
| 2007/0286510 | A1 | 12/2007 | Fukuhara | |
| 2008/0013845 | A1 | 1/2008 | Fukuhara et al. | |
| 2008/0013846 | A1 | 1/2008 | Fukuhara et al. | |

FOREIGN PATENT DOCUMENTS

| JP | 9-139944 | 5/1997 |
|---|---|---|
| JP | 10-283342 | 10/1998 |
| JP | 2002-281444 | 9/2002 |
| JP | 2004-30515 | 1/2004 |
| JP | 2005-109836 | 4/2005 |
| JP | 2007-514330 | 5/2007 |

OTHER PUBLICATIONS

U.S. Appl. No. 11/814,257, filed Jul. 18, 2007, Takahiro Fukuhara, et al.
Wim Sweldens, "The Lifting Scheme: A Custom-Design Construction of Biorthogonal Wavelets", Applied and Computational Harmonic Analysis, vol. 3, article No. 0015, 1996, pp. 186-200.
Christos Chrysafis, et al., "Line-Based, Reduced Memory, Wavelet Image Compression", IEEE Transactions on Image Processing, vol. 9, No. 3, Mar. 2000, pp. 378-389.

* cited by examiner

*Primary Examiner* — Hadi Akhavannik
(74) *Attorney, Agent, or Firm* — Oblon, Spivak, McClelland, Maier & Neustadt, L.L.P.

(57) ABSTRACT

An image data processing apparatus includes a memory for storing coefficient data obtained by performing a wavelet transform on image data, a calculation unit for calculating a memory address of the memory storing the coefficient data, based on an encoding parameter of the image data and an amount of data of the coefficient data, a memory area reservation unit for reserving a memory area where the coefficient data is to be written, in accordance with the memory address calculated by the calculation unit, and a write unit for rearranging the coefficient data in the order of inverse wavelet transform and writing the order-rearranged coefficient data onto the memory area reserved by the memory area reservation unit.

14 Claims, 18 Drawing Sheets

FIG. 8

INPUT IMAGE

WAVELET TRANSFORM RESULTS (ANALYSIS)

OUTPUT IMAGE

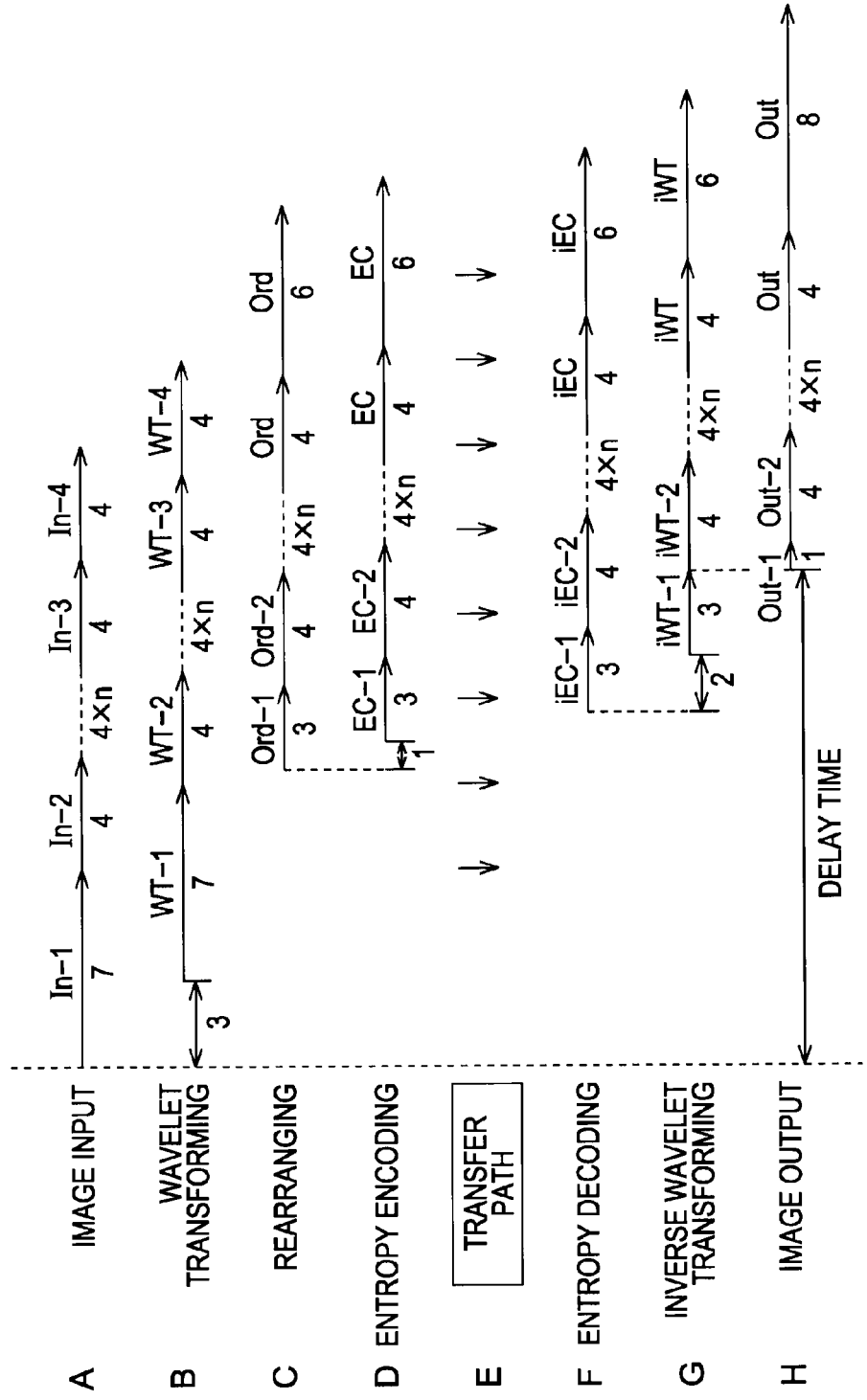

METHOD AND APPARATUS FOR PROCESSING IMAGE DATA BY REARRANGING WAVELET TRANSFORM DATA

CROSS REFERENCES TO RELATED APPLICATIONS

The present invention contains subject matter related to Japanese Patent Application JP 2007-132094 filed in the Japanese Patent Office on May 17, 2007, the entire contents of which are incorporated herein by reference.

BACKGROUND OF THE INVENTION

1. Field of the Invention

The present invention relates to an image processing apparatus and an image processing method and, in particular, to an image processing apparatus and an image processing method for shortening delay time in an inverse wavelet transform.

2. Description of the Related Art

Joint Photographic Experts Group (JPEG) standardized by the Internal Standards Organization (ISO) is available as a typical image compression method. In accordance with the JPEG standard, discrete cosine transform (DCT) is used and, it is known that if a relatively high number of bits is assigned, good encoded and decoded images result.

Methods of segmenting an image into a plurality of bands using a filter bank including a high-pass filter and a low-pass filter and encoding the image on a per band basis have been currently actively studied. The wavelet transform encoding draws attention as a new technique superseding the DCT because the wavelet transform encoding is free from block noise at high compression rate characteristic of the DCT transform.

JPEG2000 standardized January 2001 adopts a combination of the wavelet transform and highly efficient entropy encoding (bit modeling by bit plane and arithmetic coding) and provides a marked improvement in encoding efficiency in comparison with JPEG.

In a wavelet transform process, such as the one disclosed in Japanese Unexamined Patent Application Publication No. 10-283342, image data is input and a horizontal filtering operation and a vertical filtering operation are performed on the input image data while the image data is stepwise segmented into a low-frequency component.

Image data is wavelet transformed into coefficient data (frequency component). The wavelet transformed coefficient data is inverse wavelet transformed into original image data. The inverse wavelet transform restores finally the original image by performing a synthesis filtering operation on a high-frequency component and a low-frequency component from a topmost segmentation level to the lowest segmentation level.

Such an encoding system using the wavelet transform and the inverse wavelet transform finds applications in an image data transmission system such as a video conference or a video gaming system. More specifically, the image data is wavelet transformed on a transmitter side, and resulting coefficient data is entropy encoded and then transmitted as encoded date to a receiver side. At the receiver side, the received encoded data is entropy decoded. The coefficient data is then inverse wavelet transformed into the original image data. Such a series of processes is widely known.

SUMMARY OF THE INVENTION

Image data transmission is preferably performed with short delay time in an image transmission system such as a video conference system or a video gaming system.

There is also a need to shorten delay time in an inverse wavelet transform in a receiver side.

It is thus desirable to shorten the delay time in the inverse wavelet transform.

In accordance with one embodiment of the present invention, an image data processing apparatus, includes a memory for storing coefficient data obtained by performing a wavelet transform on image data, a calculation unit for calculating a memory address of the memory storing the coefficient data, based on an encoding parameter of the image data and an amount of data of the coefficient data, a memory area reservation unit for reserving a memory area where the coefficient data is to be written, in accordance with the memory address calculated by the calculation unit, and a write unit for rearranging the coefficient data in the order of inverse wavelet transform and writing the order-rearranged coefficient data onto the memory area reserved by the memory area reservation unit.

The memory area reservation unit may reserve the memory area of the coefficient data by lineblock, each lineblock being image data of lines required to generate one line of the coefficient data in the lowest-frequency subband.

The memory area reservation unit may reserve the memory area to write the coefficient data so that the coefficient data of a low-frequency component is arranged at a leading position of the memory address and so that the coefficient data of a high-frequency component is arranged at a trailing position of the memory address.

The image data processing apparatus may include a read unit for reading the coefficient data, written on the memory by the write unit, in the order of from a low-frequency component to a low-frequency component.

The image data processing apparatus may include a read unit for reading the coefficient data, written on the memory by the write unit, in the order of from a leading address.

The image data processing apparatus may further include an acquisition unit for acquiring the encoding parameter of the image data.

The encoding parameter may include a horizontal size of input image data and the number of vertical lines of the input image data.

The encoding parameter may include a bit accuracy.

The encoding parameter may include a segmentation level of the wavelet transform.

In accordance with one embodiment of the present invention, an image data processing method includes steps of storing coefficient data obtained by performing a wavelet transform on image data, calculating a memory address of a memory storing the coefficient data, based on an encoding parameter of the image data and an amount of data of the coefficient data, reserving a memory area where the coefficient data is to be written, in accordance with the calculated memory address, and rearranging the coefficient data in the order of inverse wavelet transform and writing the order-rearranged coefficient data onto the reserved memory area.

In accordance with embodiments of the present invention, the memory address of the memory storing the coefficient data is determined based on the amount of the coefficient data obtained through the wavelet transform performed on the image data and the encoding parameter of the image data. The area where the coefficient data is to be stored is reserved. The coefficient data is rearranged in the order of the inverse wavelet transform while the rearranged coefficient data is written onto the memory area reserved by the memory area reservation unit.

In accordance with embodiments of the present invention, the coefficient data generated through the wavelet transform is rearranged in the order of the inverse wavelet transform. A delay time in the inverse wavelet transform is reduced.

BRIEF DESCRIPTION OF THE DRAWINGS

FIG. 8 illustrates a memory map of a coefficient data storage area;

FIG. 17 diagrammatically illustrates parallel operations of elements in each of the encoding apparatus and the decoding apparatus.

DESCRIPTION OF THE PREFERRED
EMBODIMENTS

Figure 1:
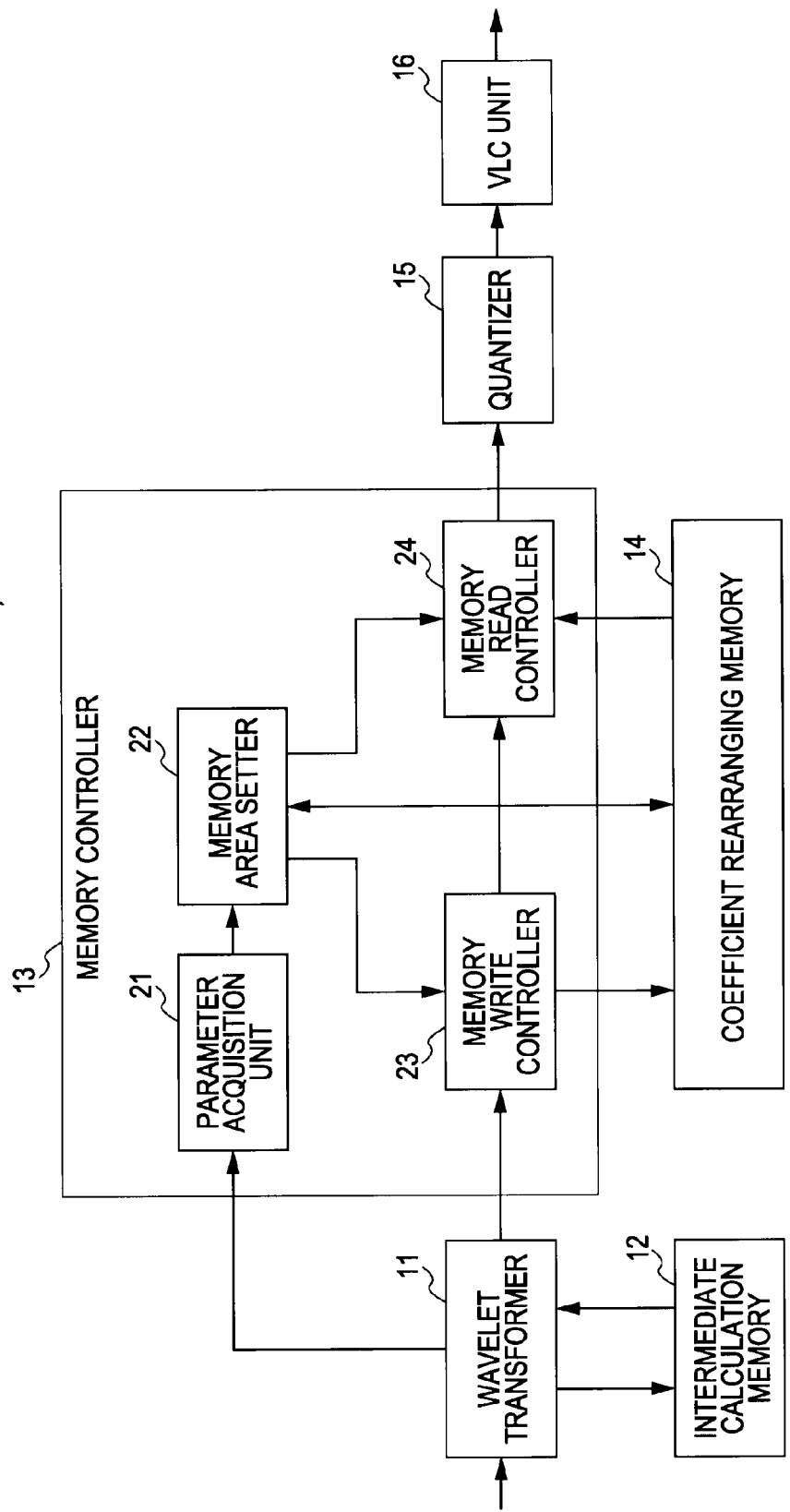
FIG. 1 is a block diagram of an encoding apparatus in accordance with one embodiment of the present invention.

FIG. 1 is a block diagram of an encoding apparatus 1. The encoding apparatus 1 of FIG. 1 includes a wavelet transformer 11, an intermediate calculation memory 12, a memory controller 13, a coefficient rearranging memory 14, a quantizer 15 and a variable-length coding (VLC) unit 16.

The image data input to the encoding apparatus 1 is temporarily stored on the intermediate calculation memory 12 via the wavelet transformer 11. The wavelet transformer 11 wavelet-transforms the image data stored on the intermediate calculation memory 12. More specifically, the wavelet transformer 11 reads the image data from the intermediate calculation memory 12, filters the read image data through analysis filters to generate coefficient data of a high frequency region and a low frequency region, and then stores the generated coefficient data on the intermediate calculation memory 12. The encoding apparatus 1, including a horizontal analysis filter and a vertical analysis filter, filter analyzes image data groups in both an image horizontal direction and an image vertical direction. The wavelet transformer 11 reads again the coefficient data of the low frequency region from the intermediate calculation memory 12, and performs a filtering operation on the read coefficient data using the analysis filters, thereby generating further data of coefficients in a high frequency region and a low frequency region. The generated coefficient data is stored on the intermediate calculation memory 12.

Upon reaching a predetermined segmentation level (a final segmentation level) through repeating the above process, the wavelet transformer 11 reads the coefficient data from the intermediate calculation memory 12 and writes the read coefficient data on the memory write controller 23 in the memory controller 13.

The wavelet transformer 11 acquires encoding parameters including a resolution of the input image data (a horizontal size×the number of vertical lines), a bit accuracy and a segmentation level of the wavelet transform. The encoding parameters may be input from outside the encoding apparatus 1, may be transmitted together with the input image data, or may be set up in the input image data.

The memory controller 13 includes a parameter acquisition unit 21, a memory area setter 22, a memory write controller 23 and a memory read controller 24. The memory controller 13 controls writing of the coefficient data onto the coefficient rearranging memory 14 and reading of the coefficient data from the coefficient rearranging memory 14.

The parameter acquisition unit 21 acquires the encoding parameter of the input image data from the wavelet transformer 11 and supplies the acquired encoding parameter to the memory area setter 22. Alternatively, the parameter acquisition unit 21 may acquires the encoding parameter from outside the encoding apparatus 1.

As will be described later with reference to FIG. 7, the memory area setter 22 determines, based on the encoding parameter, an amount of coefficient data generated by the wavelet transformer 11 and determines a memory address of the coefficient rearranging memory 14 storing the coefficient data, based on the encoding parameter and the amount of coefficient data. The memory area setter 22 reserves an area to store the coefficient data (hereinafter referred to as a coefficient data storage area) in the coefficient rearranging memory 14 and generates a memory map indication a position (memory address) storing each unit of coefficient data in the memory storage area. The memory area setter 22 supplies, to each of the memory write controller 23 and the memory read controller 24, information indicating a leading address of the coefficient data storage area and the memory map.

Figure 7:
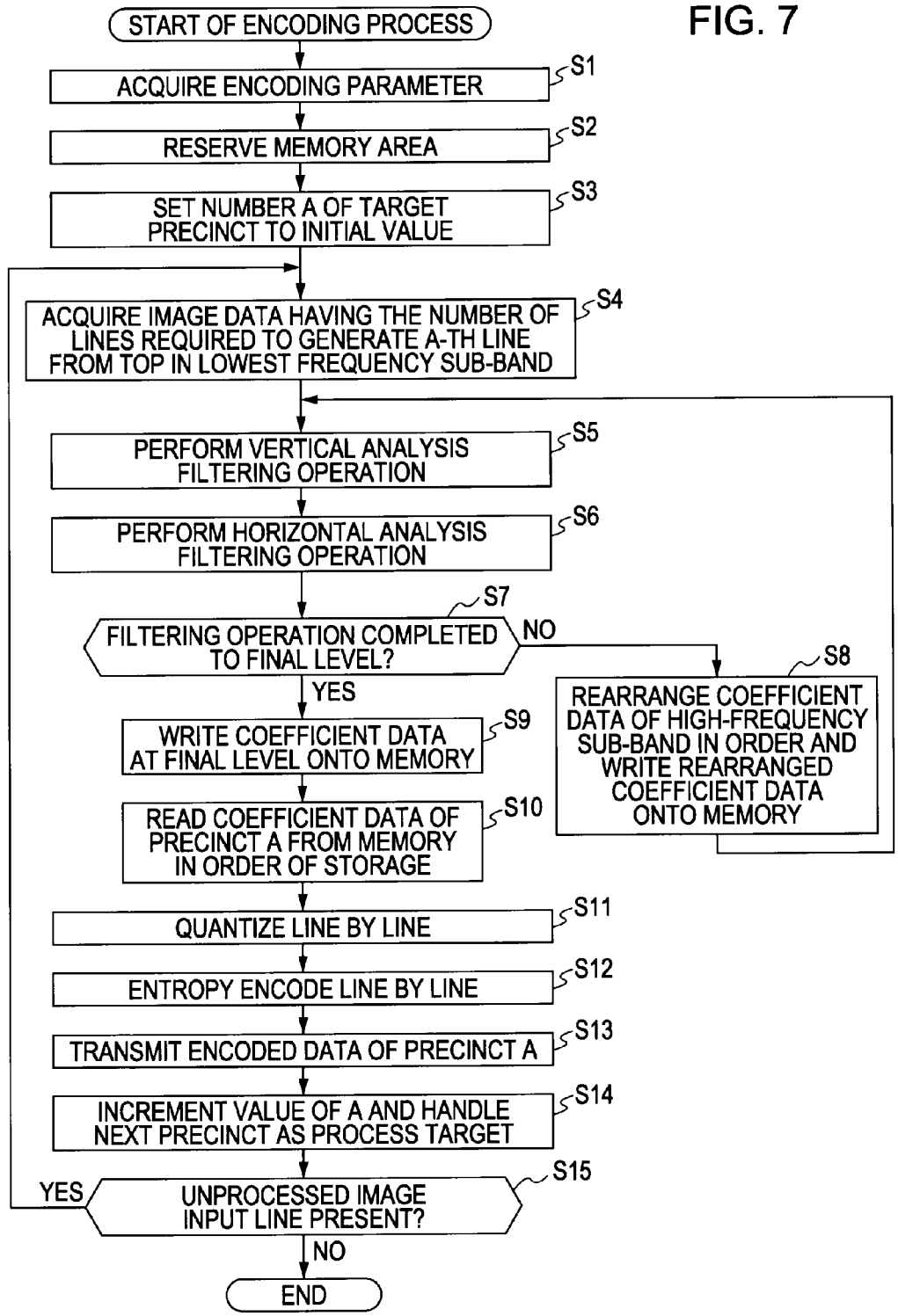
FIG. 7 is a flowchart illustrating an encoding process.

With reference to FIG. 7, the memory write controller 23 rearrange the coefficient data in the order of inverse wavelet transform while writing the coefficient data supplied from the wavelet transformer 11 onto the coefficient data storage area of the coefficient rearranging memory 14.

Upon receiving a signal instructing the reading of the coefficient data from the memory write controller 23, the memory read controller 24 reads the coefficient data starting with the leading address of the coefficient data storage area of the coefficient rearranging memory 14, and then supplies the coefficient data to the quantizer 15.

The quantizer 15 quantizes the supplied coefficient data in a predetermined method, and supplies the quantized coefficient data to the VLC unit 16.

The VLC unit 16 encodes the supplied coefficient data in accordance with a predetermined encoding method such as the Huffman coding or arithmetic coding. The VLC unit 16 outputs the generated encoded data from the encoding apparatus 1.

The process of the wavelet transformer 11 of FIG. 1 is described in detail. The wavelet transform is described first. As diagrammatically illustrated in FIG. 2, in the wavelet transform to the image data, the image data is segmented into a high spatial frequency region and a low spatial frequency. Segmentation is recursively repeated to resulting low-frequency data in spatial frequency.

Analysis filters include a horizontal analysis filter for performing a horizontal analysis filtering operation on the image data in a horizontal direction on a screen and a vertical analysis filter for performing a vertical analysis filtering operation on the image data in a vertical direction on the screen. One analysis filtering operation is performed in each direction, thereby segmenting the image data into four subbands. The wavelet transformer 11 repeats recursively the horizontal analysis filtering operation and the vertical analysis filtering operation on the bands lower in spatial frequency in horizontal and vertical directions (i.e., in a layer fashion).

Figure 2:
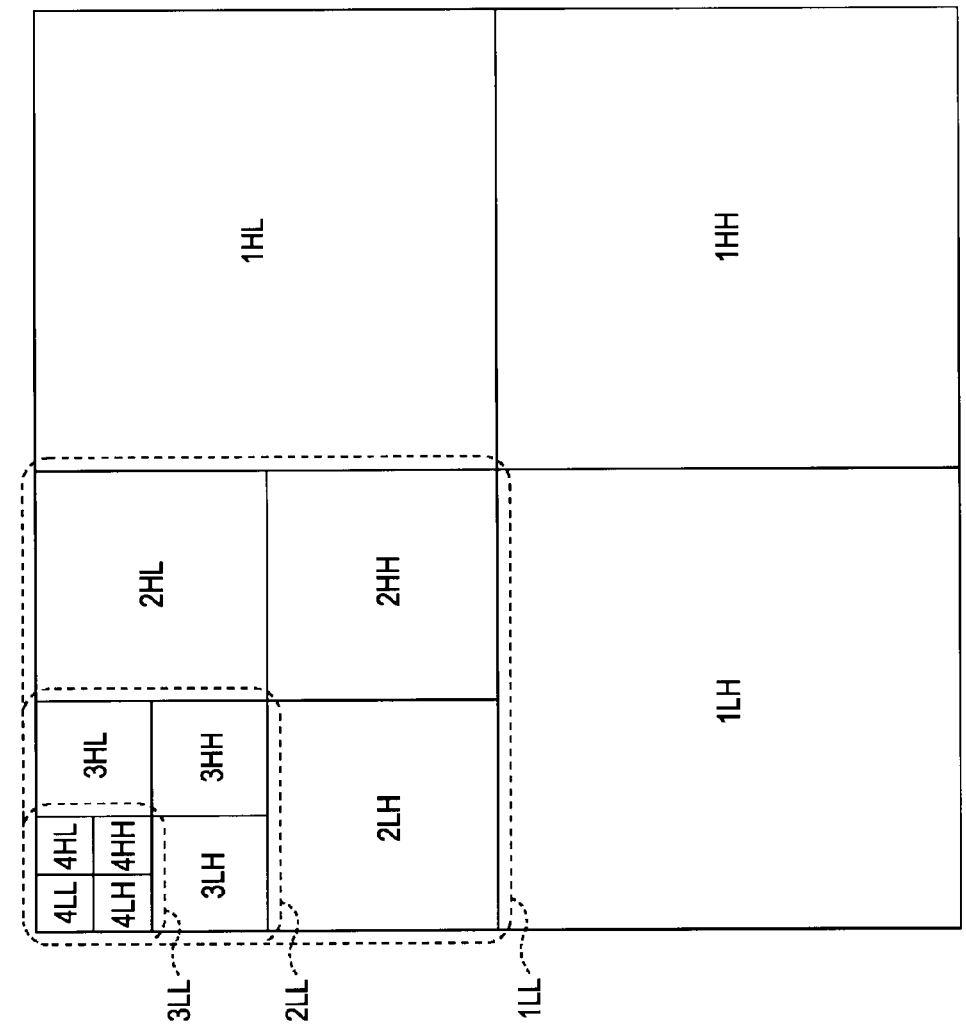
FIG. 2 diagrammatically illustrates wavelet transform.

FIG. 2 diagrammatically illustrates the analysis filtering operation that has been repeated by four times. The horizontal and vertical analysis filtering operations are repeated recursively by four times, a frequency component of the image data of one picture is segmented into thirteen subbands in a layer structure. Data of each subband, i.e., image data of a baseband is segmented into a frequency component on a per frequency band basis. The resulting frequency component is referred to as coefficient data (or simply component).

As shown in FIG. 2, solid squares and broken squares with round corners represent subbands resulting from the analysis filtering operation. A number placed in each subband represents a segmentation level of that subband. More specifically, the number represents how many times the analysis filtering operation has been performed on the image data as the baseband. The subbands labeled the letters "L" and "H" are respectively a low-frequency component and a high-frequency component. The label on the left-hand side represents analysis results of the horizontal analysis filtering operation and the label on the right-hand side represents analysis results of the vertical analysis filtering operation.

As shown in FIG. 2, a first analysis filtering operation is performed on the image data of the baseband, thereby resulting in four subbands (1LL, 1LH, 1HL, and 1HH) at a segmentation level of 1. A second analysis filtering operation is performed on the subband "1LL" having a low-frequency component in both the horizontal direction and the vertical direction. The second analysis filtering operation results in four subbands (2LL, 2LH, 2HL, and 2HH) at a segmentation level of 2. A third analysis filtering operation is performed on the subband "2LL" having a low-frequency component in both the horizontal direction and the vertical direction. The third analysis filtering operation results in four subbands (3LL, 3LH, 3HL, and 3HH) at a segmentation level of 3. A fourth analysis filtering operation is performed on the subband "3LL" having a low-frequency component in both the horizontal direction and the vertical direction. The fourth analysis filtering operation results in four subbands (4LL, 4LH, 4HL, and 4HH) at a segmentation level of 4.

Figure 3:
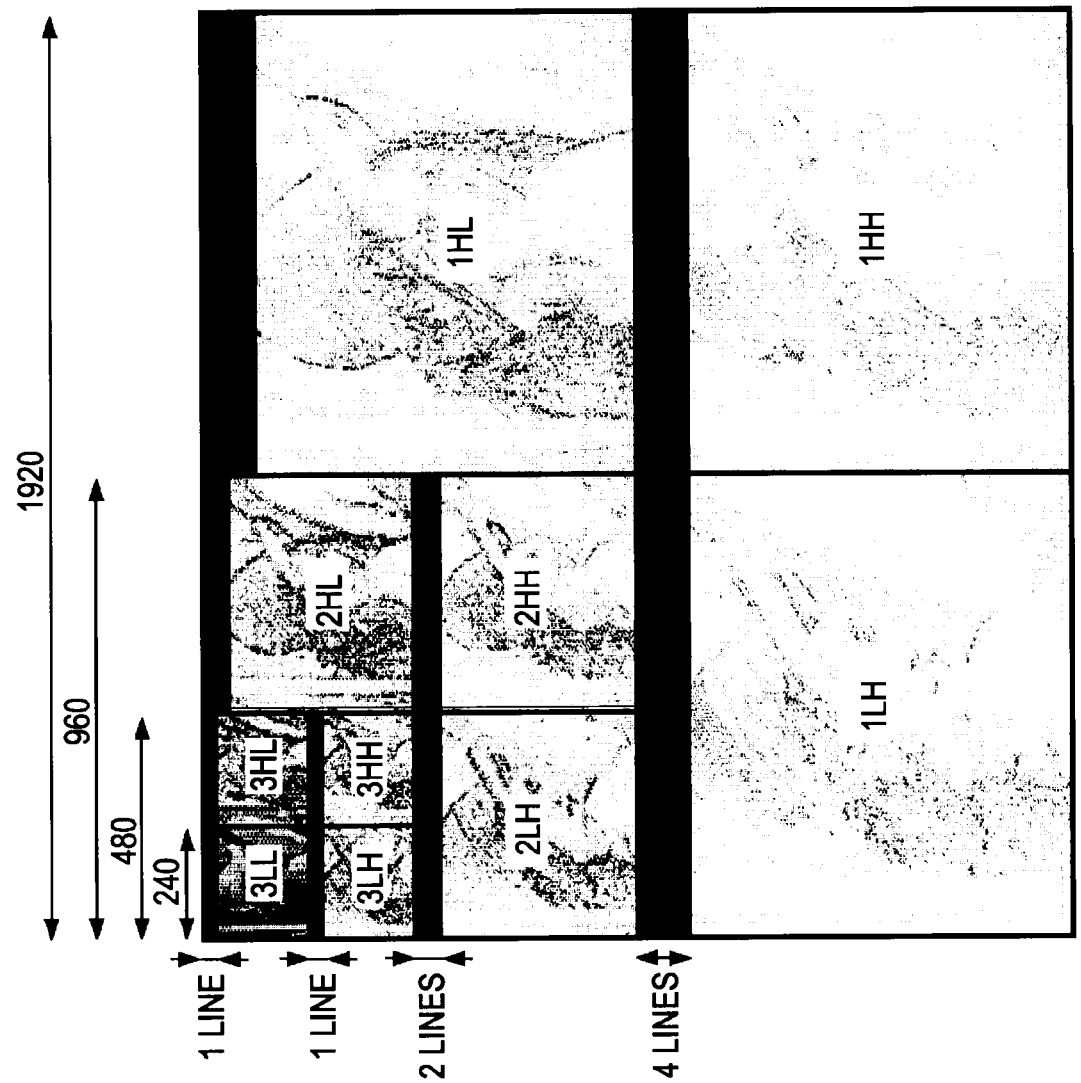
FIG. 3 diagrammatically illustrates the wavelet transform.

Transform and segmentation are performed on the low frequency component because energy of image concentrates more on a higher subband (lower frequency component) as shown in FIG. 3. The analysis filtering operation is recursively performed, generating the subbands in a layer structure. Data of a band having a low spatial frequency is narrowed into a small area so that efficient compression encoding is performed in an entropy encoding process.

In the discussion that follows, the analysis filtering operation is performed again on the subband "LL" having the low-frequency component in the horizontal and vertical directions from among the four subbands generated in the analysis filtering operation. The subband "LL" is referred to as a low-frequency subband and the remaining subbands free from subsequent analysis filtering operation, i.e., "LH," "HL," and "HH" are referred to as high-frequency subbands.

In a first method, the wavelet transform may be performed on the entire picture. In a second method, one picture of image data may be divided by several lines and the wavelet transform may be in parallel performed on divided pictures. An amount of image data to be processed per wavelet transform process is smaller in the second method than in the first method. An output timing of the wavelet transform results can be started earlier in the second method. The delay time in the wavelet transform is thus reduced.

The number of lines per wavelet transform process (process unit) is based on the number of lines to obtain one line of coefficient data at the subband at the topmost level at a predetermined segmentation level in the wavelet transform.

An analysis filtering operation segments the image data into four, the number of lines are halved as shown in FIG. 3. In the wavelet transform of a segmentation level of 3, eight lines of baseband image data are required to obtain one line of coefficient data at the topmost level subbands (3LL, 3LH, 3HL, and 3HH). The wavelet transform is thus performed with eight lines or more of the baseband image data as a process unit. With a segmentation level of 4 as shown in FIG. 2, sixteen lines of baseband image data are required.

A set of baseband image data required to generate one of coefficient data at the low-frequency subband "LL" at the topmost level, i.e., at the low-frequency component subband is referred to as a precinct (or lineblock). The precinct also refers to a set of coefficient data of all subbands that are obtained by wavelet transforming the image data of one precinct. The set of coefficient data of all subbands that are obtained by wavelet transforming the image data of one precinct is substantially identical to the set of baseband image data required to generate one of coefficient data at the low-frequency subband "LL" at the topmost level.

Figure 4:
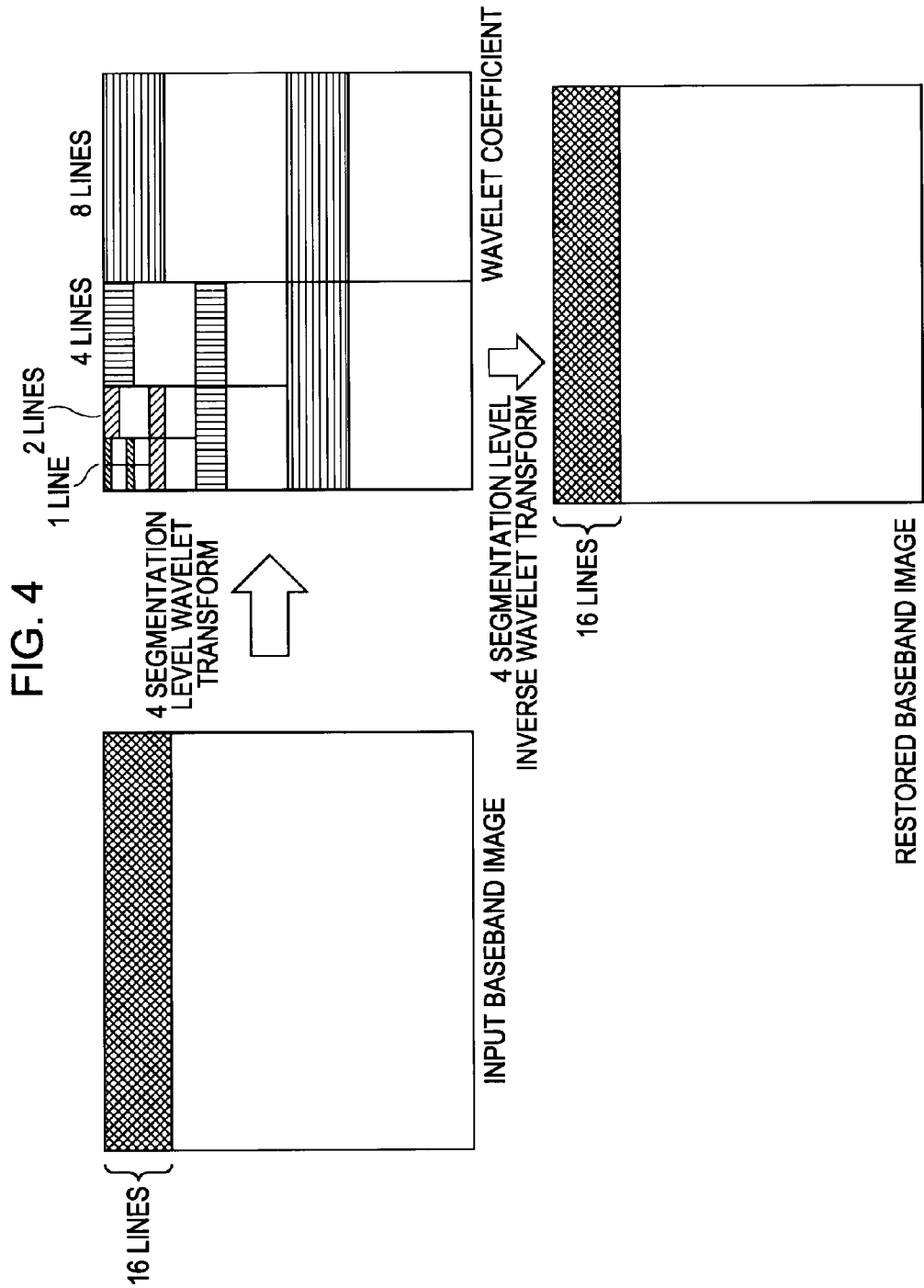
FIG. 4 diagrammatically illustrates the wavelet transform.

As shown in FIG. 4, sixteen lines of baseband image data as one precinct may be wavelet transformed at a segmentation level of 4. Such a wavelet transform results in eight lines of coefficient data at a segmentation level of 1, four lines of coefficient data at a segmentation level 2, two lines of coefficient data at a segmentation level 3, and one line of coefficient data at a segmentation level 4.

Figure 5:
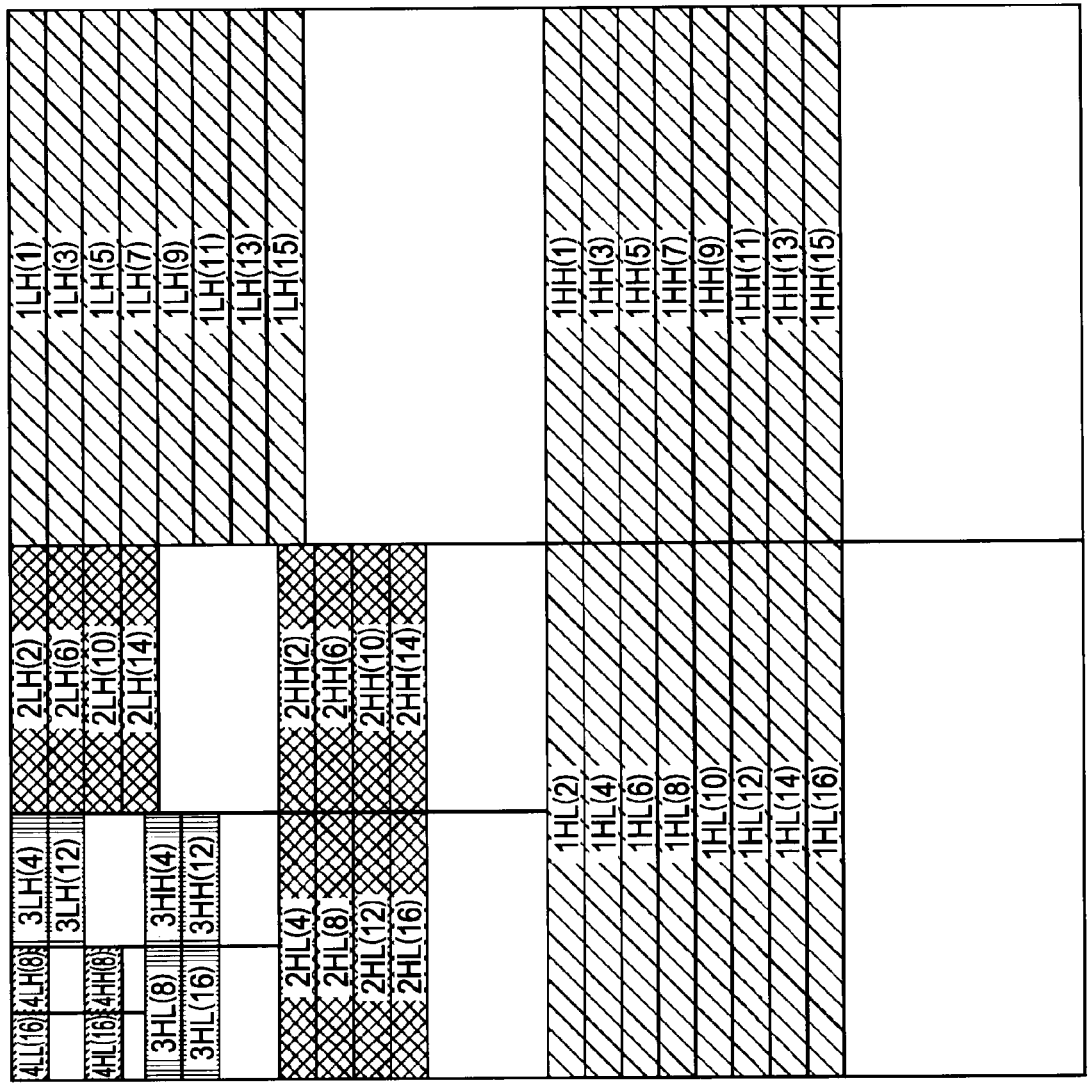
FIG. 5 illustrates an order of generation of coefficient data.

FIG. 5 illustrates the order of generation of lines of the coefficient data generated per precinct through the wavelet transform at a segmentation level of 4. Each line is labeled with a parenthesized number in the baseband image data. That line is generated when a line within the precinct indicated by the parenthesized number indicates is input. For example, 1HH(1) is generated when a first line of the baseband image data is input, 1HL(8) is generated when an eighth line of the baseband image data is input, 4LH(8) is generated when the eighth line of the baseband image data is input, and 4LL(16) is generated when an sixteenth line of the baseband image data is input.

Figure 15:
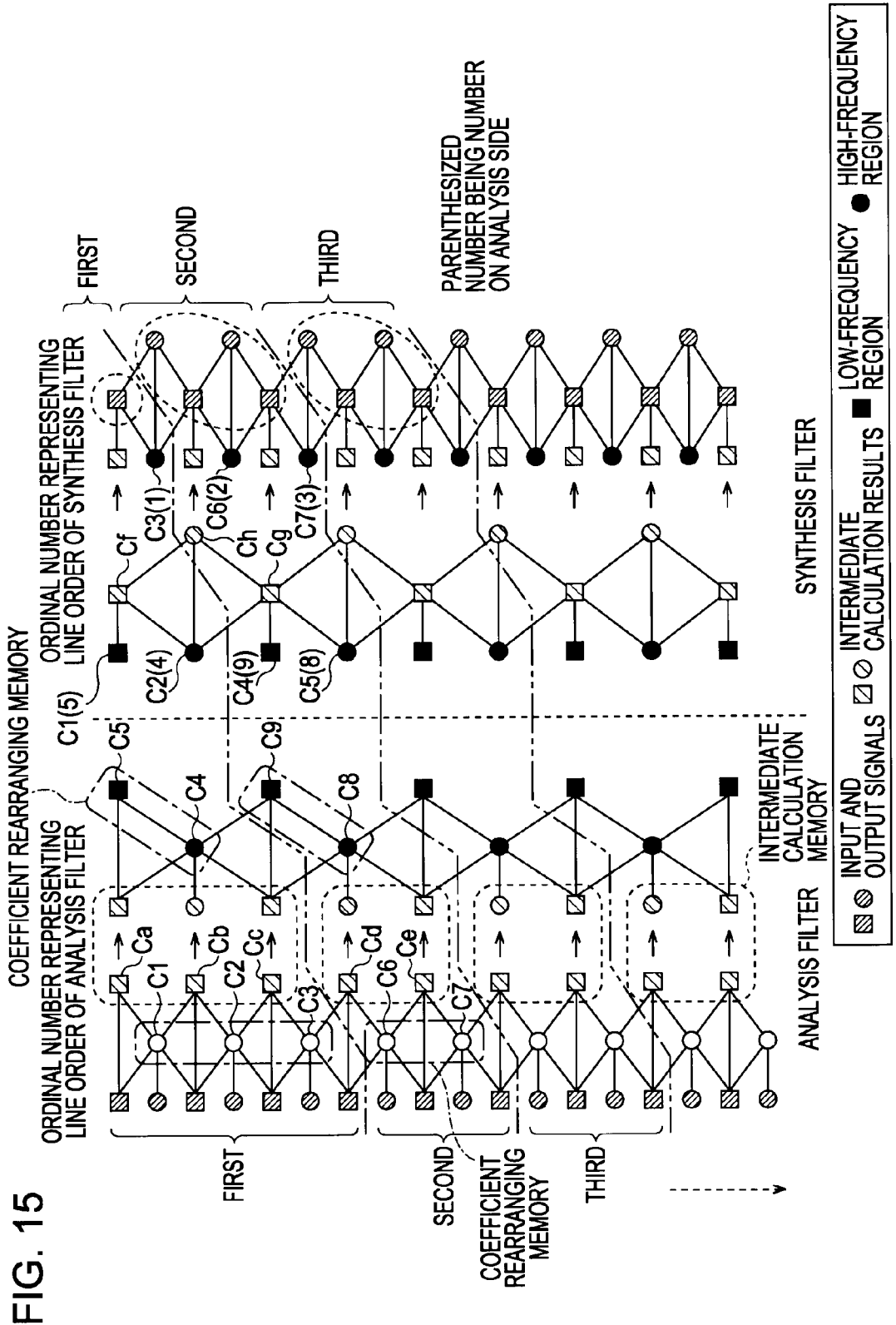
FIG. 15 illustrates a lifting filtering operation of the 5×5 filter performed to a segmentation level=2.

FIG. 16 illustrates the order of write of the coefficient data of FIG. 15 to the coefficient rearranging memory 14. As in FIG. 15, each parenthesized number placed to the left of the chart of FIG. 16 indicates a line wherein when the line indicated by the parenthesized number is input, the corresponding subband is written.

Figure 6:
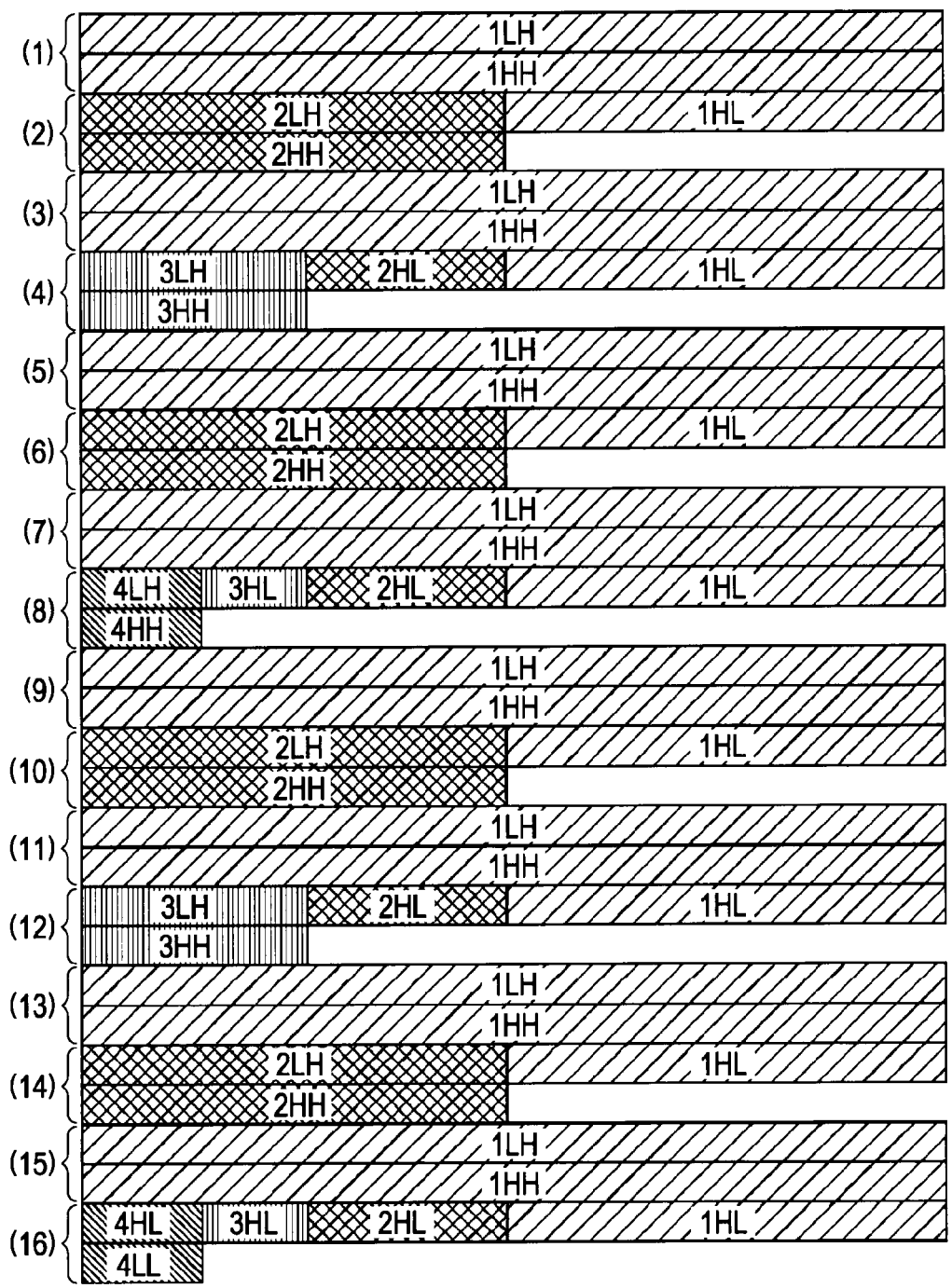
FIG. 6 illustrates an order of write of the coefficient data.

The horizontal axis of FIG. 6 represents time axis (process cycle count). For example, if a sample count (pixel count) of the baseband image data in a horizontal direction is 1920, a maximum width along the horizontal axis of FIG. 6 corresponds to 1920 cycles. For example, 1LH at a first row of FIG. 6 is written onto the coefficient rearranging memory 14 for 1920 cycles, 1HH at a second row is written onto the coefficient rearranging memory 14 for 1920 cycles, each of 2LH and 1LH at a third row is written onto the coefficient rearranging memory 14 for 960 cycles, and 2HH at a fourth row is written onto the coefficient rearranging memory 14 for 960 cycles.

In the encoding side, the coefficient data is generated in the order of from a high-frequency component to a low-frequency component and then written onto the coefficient rearranging memory 14.

An inverse wavelet transform is an operation inverse to such a wavelet transform and inverse transforms the wavelet transformed coefficient data back into original baseband image data. When the wavelet transformer 11 performs the wavelet transform by precinct as described above, an inverse wavelet transformer corresponding to the wavelet transformer 11 performs the inverse wavelet transform by precinct.

The coefficient data that is obtained by wavelet transforming 16 lines of the baseband image data at a segmentation level of 4 is converted back (restored back) into 16 lines of original baseband image data through the inverse wavelet transform at a segmentation level of 4 as shown in FIG. 4. More specifically, the lines of coefficient data at the subbands at a segmentation level of 3 are decoded from the lines of the coefficient data of subbands of a segmentation level of 4 (4LL, 4LH, 4HL, and 4HH). The lines of coefficient data at the subbands of a segmentation level of 2 (2LL) are decoded from the lines of coefficient data at the subbands of a segmentation level of 3 (3LL, 3LH, 3HL, and 3HH). The lines of coefficient data at the subbands of a segmentation level of 1 (1LL) are decoded from the lines of coefficient data at the subbands of a segmentation level of 2 (2LL, 2LH, 2HL, and 2HH). The lines of the baseband image data are decoded from the lines of coefficient data at a segmentation level of 1 (1LL, 1LH, 1HL, and 1HH).

Unlike the encoding side, the decoding side decodes the coefficient data in the order of from a low-frequency component to a high-frequency component, and the baseband image data is finally decoded.

The coefficient data is supplied in the order of the inverse wavelet transform process on the decoding side in order to decode the coefficient data fast with short delay.

If the wavelet transform and the inverse wavelet transform are performed by precinct, the coefficient data is generated in the same order and decoded in the same order except when the size of the precinct changes depending on calculation method.

As described with reference to FIG. 7, the memory write controller 23 rearranges the coefficient data generated by the wavelet transformer 11 in the order applicable to the decoding process and writes the rearranged coefficient data onto the coefficient rearranging memory 14.

The wavelet transformer 11 performs the above-described process using a filter bank containing high-frequency filters and low-frequency filters. Since a digital filter has typically an impulse response having a plurality of tap lengths, namely, a filter factor, input image data or factor data enough to perform a filtering operation needs to be buffered. When the wavelet transform is performed in multiple stages, wavelet transform factors generated in a preceding stage of the number enough to perform the filtering operation need to be buffered.

A specific wavelet transform method using a 5×3 filter is described below. The method of using the filter 5×3 filter, adopted in JPEG 2000 standard, is an excellent method enabling wavelet transform to be performed on image data with a small number of filter taps.

The impulse response (Z transform expression) of the 5×3 filter is composed of a low frequency filter $H_0(z)$ and a high frequency filter $H_1(Z)$ as represented in the following equations (1) and (2). $H_0(z)$ represents five taps and $H_1(z)$ represents three taps.

$$H_0(z)=(-1+2z^{-1}+6z^{-2}+2z^{-3}-z^{-4})/8 \quad (1)$$

$$H_1(z)=(-1+2z^{-1}-z^{-2})/2 \quad (2)$$

The coefficients of the low frequency region and the high frequency region are directly calculated using equations (1) and (2).

The encoding process of the encoding apparatus 1 is described below with reference to a flowchart of FIG. 7.

In step S1, the parameter acquisition unit 21 acquires the encoding parameter from the wavelet transformer 11 and then supplies the acquired encoding parameter to the memory area setter 22.

In step S2, the memory area setter 22 reserves a memory area.

The coefficient data generated in the wavelet transform has the same bit accuracy. For example, the bit accuracy of the input image data typically falls within a range of from 8 bits to 12 bits. If the bit accuracy of the input image data is 12 bits, the coefficient data generated through the wavelet transform at a segmentation level of 4 has all a bit accuracy of 16 bits.

The wavelet transform of a segmentation level of 4 may be performed on the image data having a resolution of 1920×1088 pixels. The resulting coefficient data has 960×544 pixels as a size of a subband at a segmentation level of 1, 480×272 pixels as a size of a subband at a segmentation level of 2, 240×136 pixels as a size of a subband at a segmentation level of 3, and 120×68 pixels as a size of a subband at a segmentation level of 4. A total amount of coefficient data generated when the image data of one precinct is wavelet transformed is as follows:

Total amount of coefficient data=horizontal size of subband at segmentation level of 4 (120)×16 bits×4 lines+horizontal size of subband at segmentation level of 3 (240)×16 bits×6 lines+horizontal size of subband at segmentation level of 2 (480)×16 bits×12 lines+horizontal size of subband at segmentation level of 1 (960)×16 bits×24 lines=184320 bits If the wavelet transform and the inverse wavelet transform are performed by precinct, the coefficient data is generated in the same order except when the size of the precinct changes depending on calculation method. The coefficient data is also decoded on the decoding side.

The memory capacity of the coefficient data storage area, namely, the memory capacity required to store the rearranged coefficient data of one precinct, and the memory address to store the coefficient data of one precinct in the coefficient data storage area are determined based on the resolution of the input image data (the horizontal size×the number of vertical lines), the bit accuracy and the segmentation level of the wavelet transform.

The memory area setter 22 determines the data amount of the coefficient data of one precinct and the memory address of the coefficient rearranging memory 14 storing the coefficient data based on the encoding parameters containing the resolution of the input image data, the bit accuracy and the segmentation level of the wavelet transform.

The memory area setter 22 reserves in the coefficient rearranging memory 14 an area having a capacity storing the coefficient data of one precinct as the coefficient data storage area. The memory area setter 22 generates the memory map indicating the storage position of the coefficient data in the coefficient data storage area.

Figure 8:
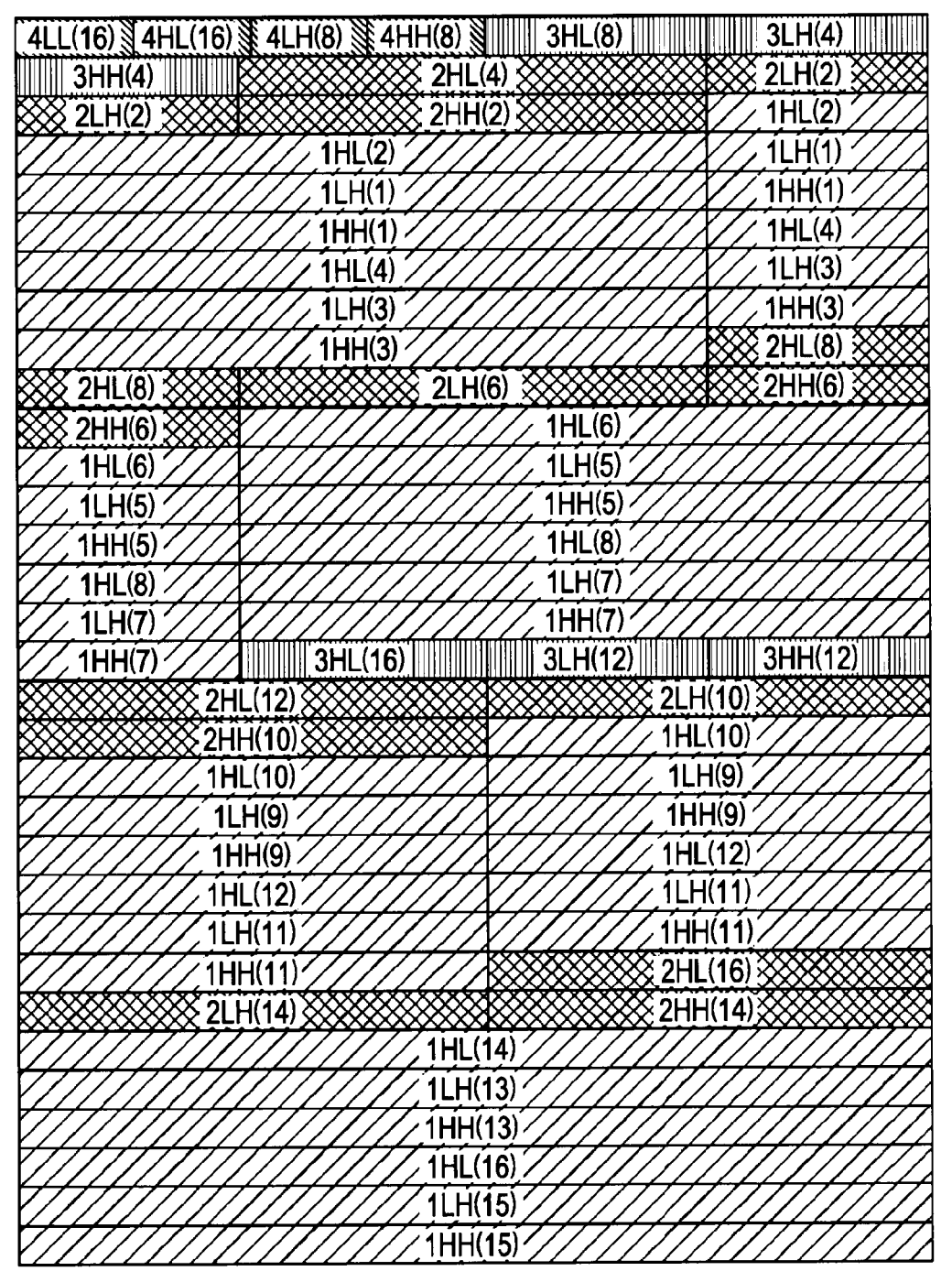

FIG. 8 illustrates a memory map of the in the wavelet transform of a segmentation level of 4. In the memory map, the coefficient data of one precinct is compactly arranged in the order of processing on the decoding side, i.e., in the order of inverse wavelet transform. In other words, the coefficient data of a low-frequency component is arranged at a leading memory address of the coefficient data storage area and the coefficient data of a high-frequency component is arranged at a trailing address of the coefficient data storage area. The memory map also indicates the data amount of each unit of coefficient data and a relative address of a head position of each coefficient data unit from the head of the coefficient data storage area, although those pieces of information are not shown in FIG. 8.

The memory area setter 22 supplies, to each of the memory write controller 23 and the memory read controller 24, information indicating the leading address of the coefficient data storage area on the coefficient rearranging memory 14 and the generated memory map.

The memory write controller 23 may generate the memory map of FIG. 8. A plurality of types of memory map may be prepared and one of the memory area setter 22 and the memory write controller 23 may select one of the memory maps depending on the resolution of the input image data, the bit accuracy, and the segmentation level of the wavelet transform.

In step S3, the wavelet transformer 11 sets a number A of a target precinct to an initial value in step S1. The number A is typically set to "1."

In step S4, the wavelet transformer 11 acquires image data of lines of the number required to generate one line at A-th line from the top in the lowest frequency subband (i.e., one precinct).

In step S5, the wavelet transformer 11 performs a vertical analysis filtering operation to the acquired image data arranged in a vertical direction on the screen.

In step S6, the wavelet transformer 11 performs a horizontal analysis filtering operation to the image data arranged in a horizontal direction on the screen.

In step S7, the wavelet transformer 11 determines whether the analysis filtering operation has reached the final level. If it is determined in step S7 that the final level has not been reached, processing proceeds to step S8.

In step S8, the memory write controller 23 rearranges the coefficient data at a high-frequency subband while writing the rearranged coefficient data onto the memory. More specifically, the wavelet transformer 11 supplies the coefficient data at the high-frequency subbands (HL, LH, and HH) at the current segmentation level to the memory write controller 23. In accordance with the memory map, the memory write controller 23 writes the supplied coefficient data onto a predetermined position in the coefficient data storage area in the coefficient rearranging memory 14. In this way, the coefficient data has been rearranged in the order of processing on the decoding side.

Processing returns to step S5. Steps S5 through S8 are cycled through until the analysis filtering operation reaches the final level in step S7. More specifically, the analysis filtering operation is repeated at the current segmentation level and the coefficient data of the high-frequency subbands is written on the predetermined position in the coefficient data storage area indicated by the memory map.

If it is determined in step S7 that the analysis filtering operation has reached the final level, the wavelet transformer 11 proceeds to step S9.

In step S9, the memory write controller 23 writes the coefficient data at the final level onto the memory. More specifically, the wavelet transformer 11 supplies the coefficient data generated in the analysis filtering operation at the final level directly to the memory write controller 23. The memory write controller 23 writes the acquired coefficient data onto the predetermined position in the coefficient data storage area of the coefficient rearranging memory 14 in accordance with the memory map. For example, as shown in FIG. 8, the coefficient data of 4LL, 4HL, 4LH, and 4HH is stored on the head portion of the coefficient data storage area.

In step S10, the memory read controller 24 reads from the memory the coefficient data of the precinct A in the order of storage. More specifically, the memory write controller 23 supplies a signal instructing the reading of the coefficient data to the memory read controller 24. The memory read controller 24 reads the coefficient data stored on the coefficient data storage area of the coefficient rearranging memory 14 in the order of storage starting with the leading address of the coefficient data storage area and then supplies the read coefficient data to the quantizer 15.

Figure 9:
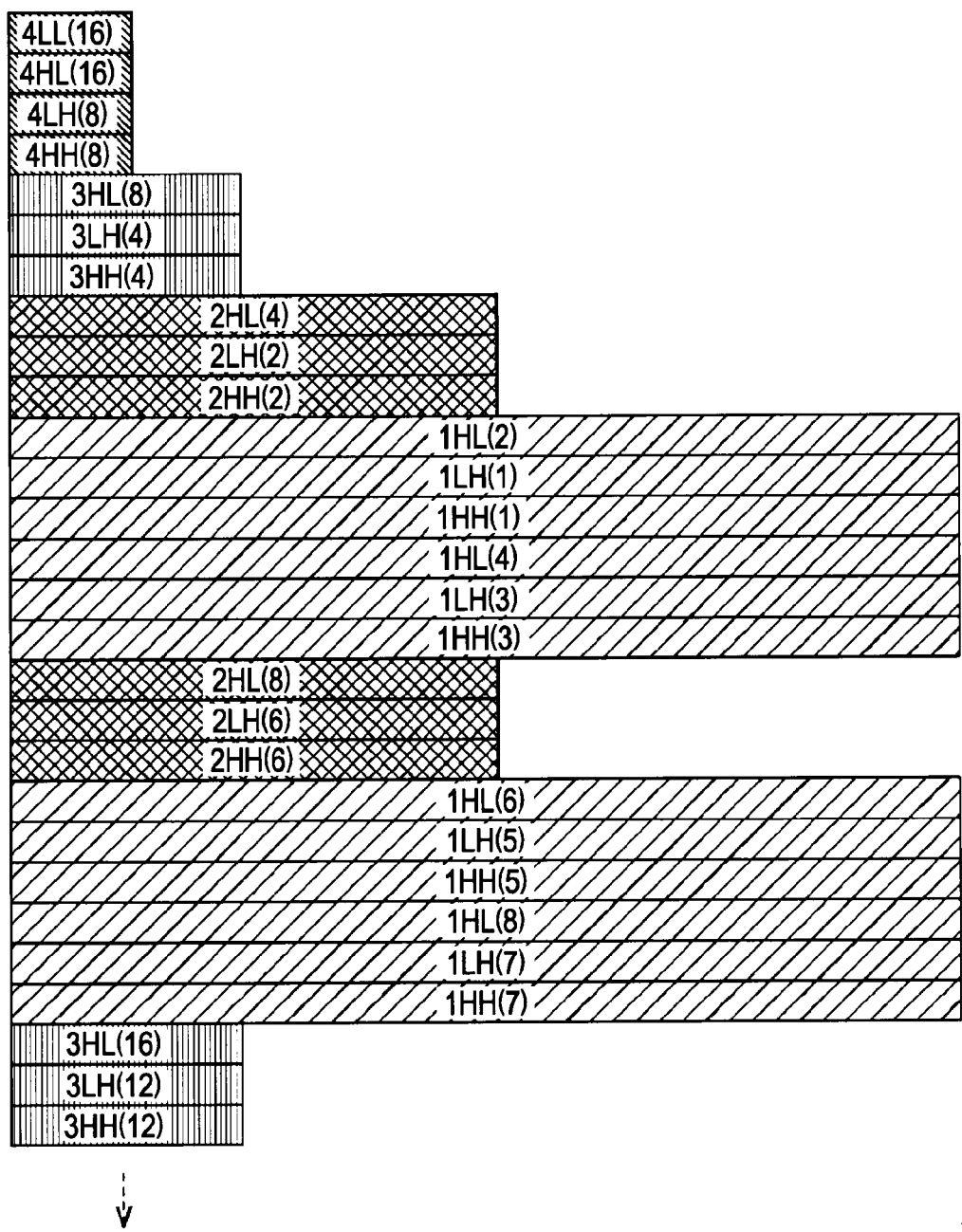
FIG. 9 illustrates the order of reading the coefficient data.
Figure 10:
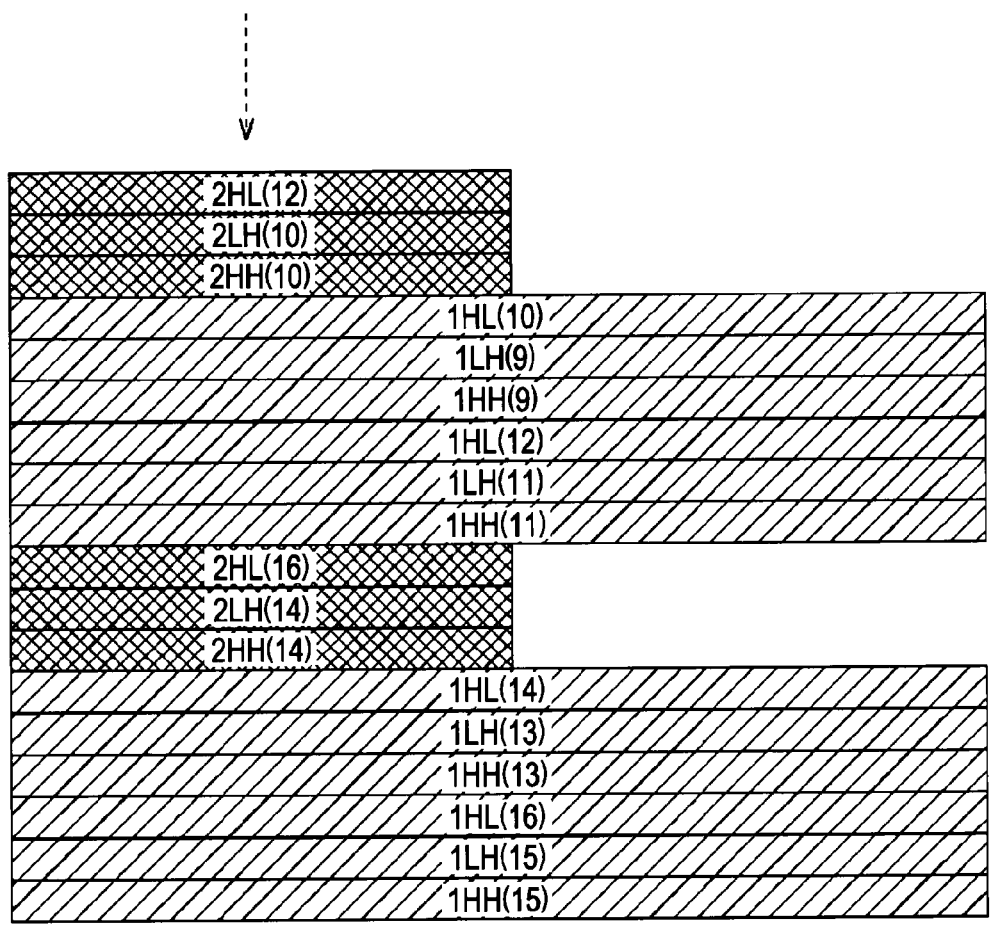
FIG. 10 illustrates the order of reading the coefficient data.

For example, if the coefficient data is stored in accordance with the memory map of FIG. 8, the memory read controller 24 reads the coefficient data as shown in FIGS. 9 and 10, starting with the coefficient data of the leading 4LL(16) and ending with the coefficient data of the trailing 1HH(15). The memory read controller 24 then supplied the read coefficient data to the quantizer 15.

In step S11, the quantizer 15 quantizes the acquired coefficient data on a line-by-line basis and supplies the quantized coefficient data to the VLC unit 16.

In step S12, the VLC unit 16 entropy encodes acquired quantization coefficients on a line-by-line basis.

In step S13, the VLC unit 16 transmits the encoded data of the precinct A from the encoding apparatus 1.

In step S14, the wavelet transformer 11 increments the value of A by "1" and handles a next precinct as a target.

In step S15, the wavelet transformer 11 determines whether an unprocessed input image line is present in the picture (field in the case of an interlace system). If it is determined in step S15 that an unprocessed input image line is present, processing returns to step S4. Step S4 and subsequent steps are repeated on a new target precinct.

Each precinct is encoded by repeating steps S4 through S15. If it is determined in step S15 that no unprocessed input image line is present, the encoding process on the picture is thus completed. The encoding process is newly performed on a next picture.

The coefficient data is thus rearranged in the order of processing on the decoding side and then supplied to the decoding side.

Since the coefficient data is read in the order of storage on the coefficient data storage area, the read operation is simplified. A prior read operation of the coefficient data is thus easily performed.

Since the write operation and the read operation of the coefficient data onto the coefficient rearranging memory 14 are performed by precinct, the required memory capacity is reduced.

Figure 11:
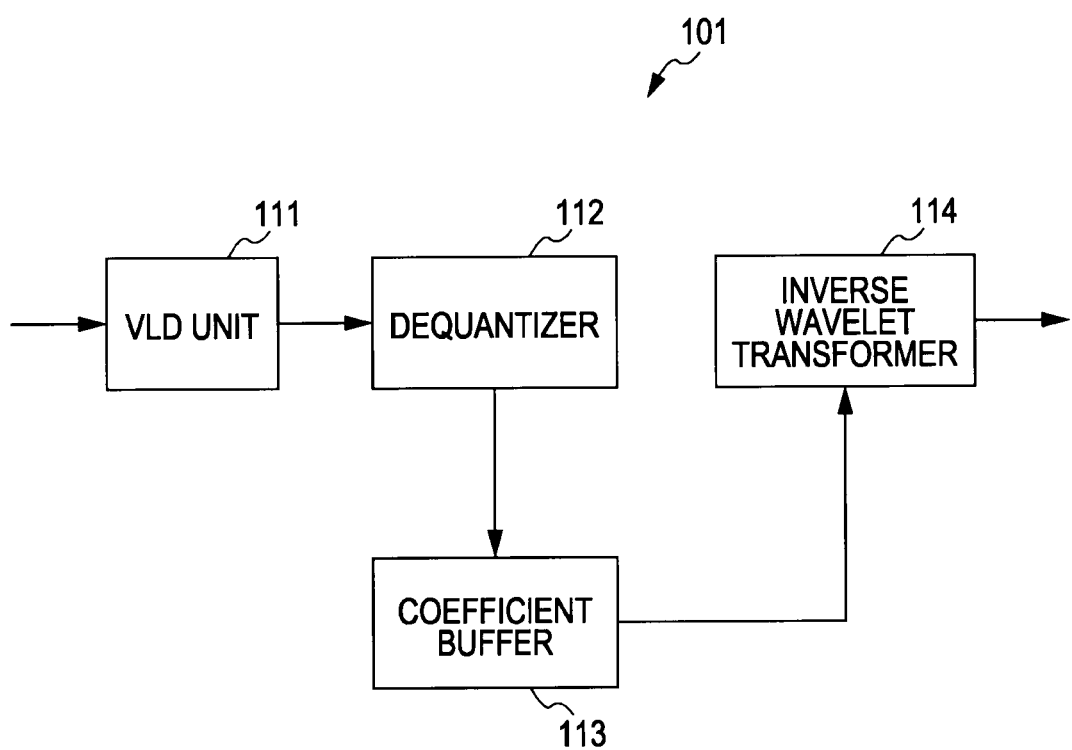
FIG. 11 is a block diagram illustrating a decoding apparatus in accordance with one embodiment of the present invention.

A decoding apparatus 101 corresponding to the encoding apparatus 1 of FIG. 1 is described below. FIG. 11 is a block diagram illustrating the decoding apparatus 101 in accordance with one embodiment of the present invention. The decoding apparatus 101 includes a variable-length decoding (VLD) unit 111, a dequantizer 112, a coefficient buffer 113, and an inverse wavelet transformer 114.

The VLD unit 111 decodes the supplied encoded data in accordance with a decoding method corresponding to the encoding method of the VLC unit 16 and supplies a resulting quantization coefficient to the dequantizer 112.

The dequantizer 112 dequantizes the acquired quantization coefficient in accordance with a dequantization method corresponding to the quantization method of the quantizer 15 and supplies resulting coefficient data to the coefficient buffer 113.

The inverse wavelet transformer 114 performs the inverse wavelet transform on the coefficient data stored on the coefficient buffer 113 and stores inverse wavelet transform results onto the coefficient buffer 113. The inverse wavelet transformer 114 repeats the inverse wavelet transform in response to the segmentation level and outputs the decoded image data from the decoding apparatus 101.

Figure 12:
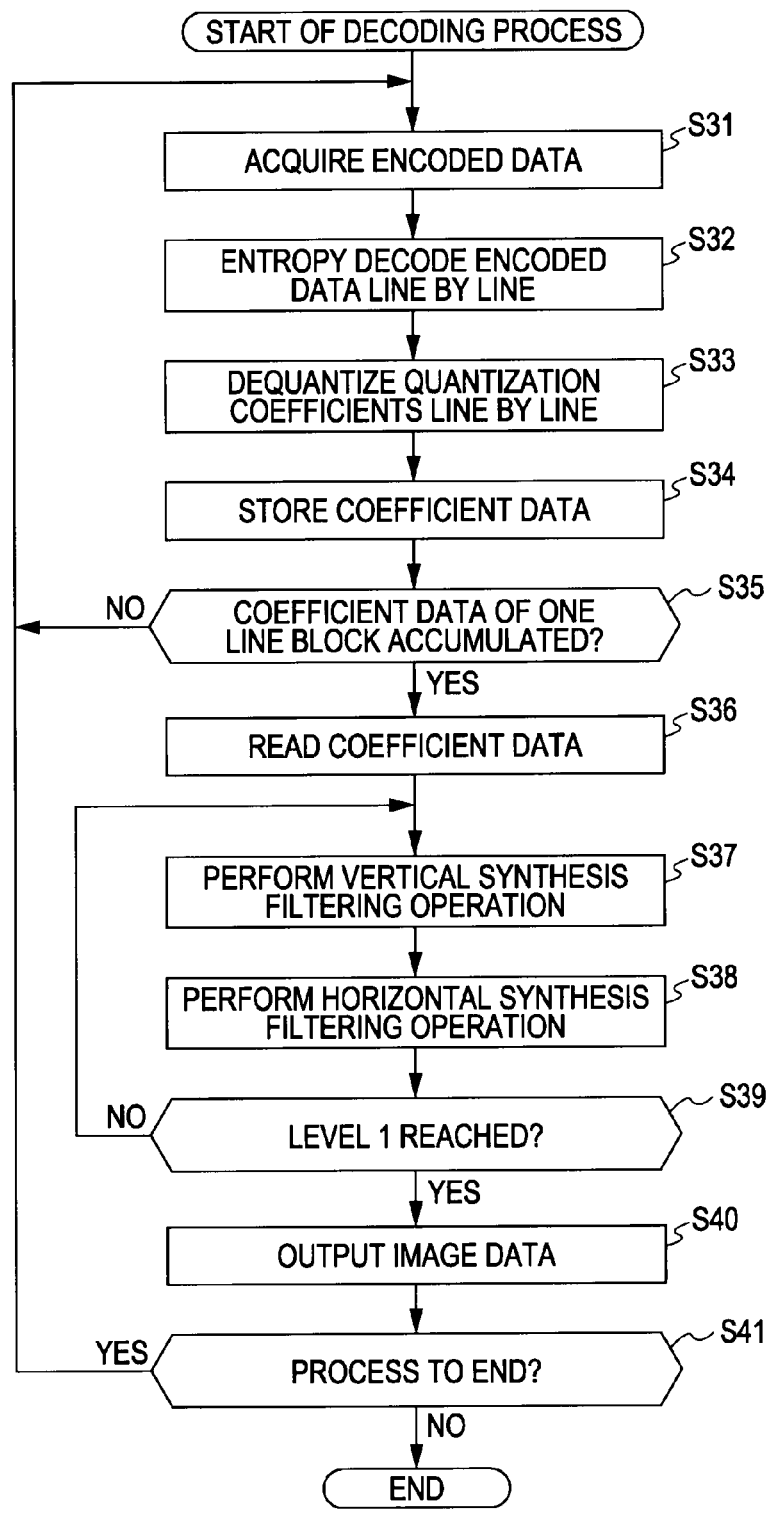
FIG. 12 is a flowchart illustrating a decoding process.

The decoding process performed by the decoding apparatus 101 is described below with reference to a flowchart of FIG. 12.

When the decoding process starts, the VLD unit 111 acquires in step S31 the encoded coefficients supplied from outside the decoding apparatus 101, entropy decodes the encoded coefficient data on a line-by-line basis, and supplies resulting quantization coefficients to the dequantizer 112.

In step S33, the dequantizer 112 dequantizes the quantization coefficients acquired on a line-by-line basis.

In step S34, the coefficient buffer 113 stores the dequantized coefficient data.

In step S35, the inverse wavelet transformer 114 determines whether the coefficient buffer 113 has stored one precinct of coefficient data. If it is determined in step S35 that one precinct of coefficient data is not stored, processing returns to step S31 to perform step S31 and subsequent steps. The inverse wavelet transformer 114 thus waits on standby until the coefficient buffer 113 has stored one precinct of coefficient data.

If it is determined in step S35 that the coefficient buffer 113 has stored one precinct of coefficient data, the inverse wavelet transformer 114 proceeds to step S36.

Since the encoding apparatus 1 supplies to the decoding apparatus 101 the coefficient data in an order of the inverse wavelet transform, the coefficient buffer 113 stores the coefficient data of one precinct in the order of the inverse wavelet transform.

In step S36, the inverse wavelet transformer 114 reads one precinct of coefficient data from the coefficient buffer 113. In step S37, the inverse wavelet transformer 114 performs a vertical synthesis filtering operation on the coefficients arranged in a vertical line on the screen. In step S38, the inverse wavelet transformer 114 performs a horizontal synthesis filtering operation on the read coefficient arranged in a horizontal line on the screen.

The coefficient data of one precinct is stored in the order of inverse wavelet transform on the coefficient buffer 113. The inverse wavelet transformer 114 simply reads the coefficient data in the order of storage from the coefficient buffer 113. There is no need for rearranging the stored coefficient data. The delay time involved in the inverse wavelet transform is thus reduced.

In step S39, the inverse wavelet transformer 114 determines whether the synthesis filtering operation has reached level=1 (with segmentation level being "1"), namely, whether inverse transform has been performed to the state prior to wavelet transform. If it is determined in step S39 that the synthesis filtering level has not reached level=1, processing returns to step S37 to repeat steps S37 and S38.

If it is determined in step S39 that the synthesis filtering operation has reached level=1, the inverse wavelet transformer 114 proceeds to step S40.

In step S40, the inverse wavelet transformer 114 outputs the image data obtained through the inverse wavelet transform.

In step S41, the VLD unit 111 determines whether to end the decoding process. If it is determined in step S110 that the decoding process is not to end, processing returns to step S31 to repeat step S31 and subsequent steps. If it is determined in step S41 that the decoding process is to end, the VLD unit 111 ends the decoding process.

The latency in the decoding process is thus reduced.

In the lifting calculation process, the precinct may change in size depending on the calculation method of the wavelet transform. In such a case, each time the size of the precinct changes, the coefficient data storage area is reserved, and the memory map is re-produced.

The lifting technique may be applied to the analysis filtering operation of the encoding apparatus 1 and the synthesis filtering operation of the inverse wavelet transformer 114 in the decoding apparatus 101. Such an application is described below.

A process of the analysis filter performing the wavelet transform is described with reference to FIG. 13. The lifting technique is applied to the 5×3 filter.

Figure 13:
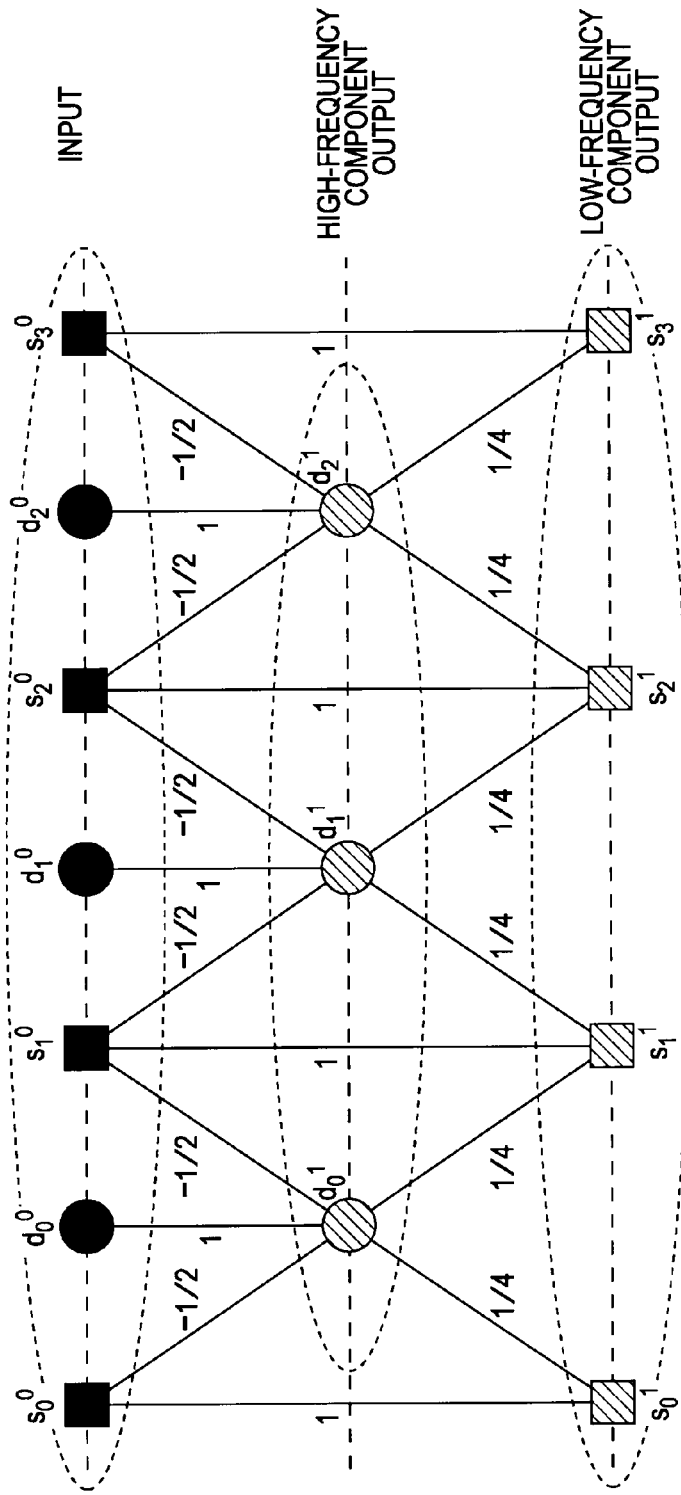
FIG. 13 illustrates a lifting structure of a 5×3 analysis filter.

As shown in FIG. 13, a top row, a medium row and a bottom row respectively represent a pixel line of an input image, a high-frequency component and a low-frequency component. The top row may represent not only the pixel line of the input image but also the coefficients obtained in a previous filtering operation. The top row here represents the pixel row of the input image. Solid squares denote even-numbered pixels or lines (with a first one being zero) and solid circles denote odd-numbered pixels or lines.

At a first phase, a coefficient $d_i^1$ of a high-frequency component is generated from the input pixel line from the following equation (3):

$$d_i^1 = d_i^0 - \tfrac{1}{2}(s_i^0 + s_{i+1}^0) \qquad (3)$$

At a second phase, a coefficient $s_i^1$ of a low-frequency component from the following equation (4) based on the generated coefficient of the high-frequency component and an odd-numbered pixel of the input image:

$$s_i^1 = s_i^0 + \tfrac{1}{4}(d_{i-1}^1 + d_i^1) \qquad (4)$$

The analysis filter segments the image data of the input image into a high-frequency component and a low-frequency component through the filtering operation.

Figure 14:
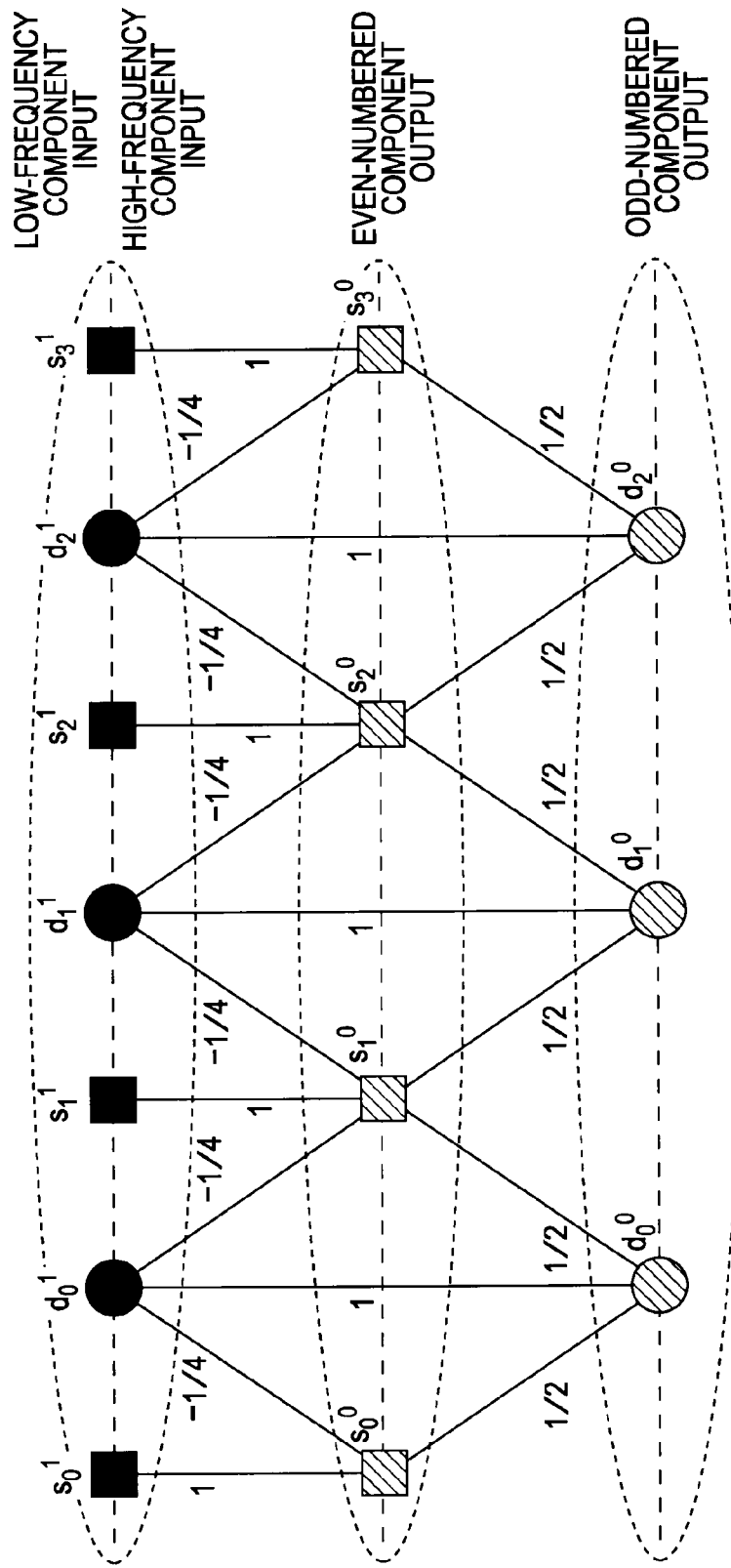
FIG. 14 illustrates a lifting structure of a 5×3 synthesis filter.

A synthesis filtering operation is generally discussed with reference to FIG. 14. The synthesis filtering operation inverse wavelet transforms the wavelet transformed coefficient. As shown in FIG. 14, a 5×3 filter corresponding to the one of FIG. 13 is used with the lifting technique applied. The top row represents input coefficients generated through the wavelet transform. Solid circles represent high-frequency coefficients and solid squares represent low-frequency coefficients.

At a first phase, an even-numbered coefficient $s_i^0$ (with a first coefficient being zero) is generated from the input coefficients of the high-frequency component and the low-frequency component in accordance with the following equation (5):

$$s_i^0 = s_i^1 - \tfrac{1}{4}(d_{i-1}^1 + d_i^1) \qquad (5)$$

At a second phase, an odd-numbered coefficient $d_i^0$ is generated from the even-numbered coefficient $s_i^0$ generated at the first phase and the coefficient $d_i^1$ of the input high-frequency component in accordance with the following equation (6):

$$d_i^0 = d_i^1 + \tfrac{1}{2}(s_i^0 + s_{i+1}^0) \qquad (6)$$

The synthesis filter performs inverse wavelet transform by synthesizing the coefficients of the high-frequency component and the low-frequency component through the filtering operation.

The wavelet transform is described more specifically. FIG. 15 illustrates a lifting filtering operation of the 5×3 filter performed to a segmentation level of 2. An analysis filter shown in the left portion of FIG. 15 is the filter of the wavelet transformer 11 of FIG. 1. A synthesis filter shown in the right portion of FIG. 15 is the inverse wavelet transformer 114 of FIG. 11.

Actual image data is two-dimensional information. However, for simplicity of explanation, FIG. 15 illustrates the image data in one-dimensional representation on the premise that pixels are present behind the plane of the page of FIG. 15 in a direction perpendicular to the page. The processes of the horizontal analysis filter and the synthesis filter are not shown in FIG. 15.

As shown in FIG. 15, a left-end column is composed of vertically arranged pixel data at positions on each line of original image data. More specifically, in the filtering operation of the wavelet transformer 11, the vertical filter is used to scan the pixels vertically on the screen. First column through third column represent a filtering operation of segmentation level=1, and fourth column through sixth column represent a filtering operation of segmentation level=2. The second column from the left represents a high frequency output based on the pixels of the left end original image data. The third column from the left represents a low frequency output based on the original image data and the high frequency component output. As shown in the fourth through sixth columns, the filtering operation of segmentation level=2 is performed on the output of the filtering operation of segmentation level=1.

In a first phase of the filtering operation of segmentation level=1, coefficient data of the high frequency component is calculated based on the image of the original image data. In a second phase, coefficient data of the low frequency component is calculated based on the coefficient data of the high frequency component calculated in the first phase, and the pixel of the original image data. The filtering operation of segmentation level=1 is illustrated in the first column through third column on the left side (analysis filter side) in FIG. 15. The calculated coefficient data of the high frequency component is stored on the coefficient rearranging memory 14 discussed with reference to FIG. 1. The coefficient data of the low frequency component is stored on the intermediate calculation memory 12 of FIG. 1.

As shown in FIG. 15, the coefficient rearranging memory 14 is represented as a dot-and-dash chain line box, and the intermediate calculation memory 12 is represented as a broken line box.

The filtering operation of segmentation level=2 is performed based on the results of the filtering operation of segmentation level=1 stored on the intermediate calculation memory 12. In the filtering operation of segmentation level=2, the coefficient data calculated as the coefficient of the low frequency component in the filtering operation of segmentation level=1 is regarded as the coefficient data containing the low frequency component and the high frequency component, and then a filtering operation similar to the filtering operation of segmentation level=1 is performed. The coefficient data of the high frequency component and the coefficient data of the low frequency component, calculated in the filtering operation of segmentation level=2, are supplied to the intermediate calculation memory 12 for storage.

The wavelet transformer 11 performs the above-described filtering operation in both the horizontal direction and the vertical direction on the screen. For example, the filtering operation of segmentation level=1 is first performed in the horizontal direction, and the generated coefficient data of the high frequency component and the low frequency component is stored on the intermediate calculation memory 12. The filtering operation of segmentation level=1 is then performed in the vertical direction on the coefficient data stored on the intermediate calculation memory 12. The filtering operation of segmentation level=1 in both the horizontal direction and the vertical direction results in four regions, namely, regions HH and HL, and regions LH and LL. The regions HH and HL are coefficient data that is obtained by further segmenting the high frequency component into a high frequency component and a low frequency component and the regions LH and LL are coefficient data that is obtained by further segmenting the low frequency component into a high frequency component and a low frequency component.

At segmentation level=2, the filtering operation is performed in each of the horizontal direction and the vertical direction on the coefficient data of the low frequency component generated in segmentation level=1. More specifically, in segmentation level=2, the region LL segmented at segmentation level=1 is further segmented into four regions. The region LL thus contains a region HH, a region HL, a region LH, and a region LL.

The wavelet transformer 11 performs the filtering operation in accordance with the wavelet transform on the screen in a vertical direction in a stepwise manner by several times, each time with several lines processed. As shown in FIG. 15, seven lines are processed at a first time starting with a first line on the screen, and four lines are processed at a second time starting with an eighth line on the screen. The number of lines is the number of lines required to generate the low frequency component of one line after each region is divided into a high frequency component and a low frequency component.

As shown in FIG. 15, a coefficient C5 obtained as a result of the filtering operation of segmentation level=2 is calculated from a coefficient $C_a$ stored on the intermediate calculation memory 12 and a coefficient C4. The coefficient C4 is calculated from the coefficient $C_a$, a coefficient $C_b$, and a coefficient $C_c$, all stored on the intermediate calculation memory 12. The coefficient $C_c$ is calculated from coefficients C2 and C3 stored on the coefficient rearranging memory 14, and image data on a fifth line. The coefficient C3 is calculated from image data on the fifth line through the seventh line. To obtain the coefficient C5 at segmentation level=2, the image data on the first line through the seventh line is required.

In contrast, the filtering operation at the second time thereafter may use the coefficient data previously calculated in the preceding filtering operation and stored on one of the intermediate calculation memory 12 and the coefficient rearranging memory 14. A smaller number of lines thus works.

More specifically, as shown in FIG. 15, from among the coefficients of the low frequency component obtained as a result of filtering operation of segmentation level=2, a coefficient C9 subsequent to the coefficient C5 is calculated from the coefficients C4 and C8 and the coefficient $C_c$ stored on the intermediate calculation memory 12. The coefficient C4 is previously calculated in the first filtering operation, and already stored on the coefficient rearranging memory 14. Similarly, the coefficient $C_c$ is previously calculated in the first filtering operation and already stored on the intermediate calculation memory 12. In the second filtering operation, only a filtering operation for calculating the coefficient C8 is performed. This new filtering operation further uses the eight through eleventh lines.

The second and subsequent filtering operations can use data calculated in the preceding filtering operation and stored on the intermediate calculation memory 12 and the coefficient rearranging memory 14, and are simply performed every four lines.

If the number of lines on the screen fails to match the number of lines in encoding, the filtering operation is performed by copying a line of the original image data to equalize the number of lines to the number of lines in encoding.

The filtering operation to obtain the coefficient data of one of the lowest frequency component is performed several times in a stepwise manner (by precinct) to cover the lines of the entire screen as will be described in detail later. This arrangement allows the image to be decoded with short delay time involved when the encoded data is transmitted and then decoded.

To perform the wavelet transform, a first buffer and a second buffer are used. The first buffer is used to perform the wavelet transform and the second buffer stores the coefficient generated when the filtering operation is performed to a predetermined segmentation level. The first buffer corresponds to the intermediate calculation memory 12 and is represented by the broken lines in FIG. 15. The second buffer corresponds to the coefficient rearranging memory 14 and is represented by the dot-and-dash chain line in FIG. 15. The coefficient stored on the second buffer is used in the decoding process and is thus to be quantized and entropy encoded in a later process.

The process of the memory controller 13 of FIG. 1 is described below. As previously discussed, the memory controller 13 rearranges the coefficient data, generated by the wavelet transformer 11, in the order of the synthesis process and then supplies the rearranged coefficient data to the quantizer 15.

As previously discussed, the coefficients are generated from the high frequency component to the low frequency component in the wavelet transform. As shown in FIG. 15, the filtering operation of segmentation level=1 generates successively the coefficient C1, the coefficient C2, and the coefficient C3 from the image data of the original image in the first process. The filtering operation of segmentation level=2 is performed on the coefficient data of the low frequency component obtained in the filtering operation of segmentation level=1 and the coefficient C4 and the coefficient C5 of the low frequency component are successively generated. More specifically, in the first process, the coefficient data is generated in the order of the coefficient C1, the coefficient C2, the coefficient C3, the coefficient C4 and the coefficient C5. This generation order of the coefficient data is natural (from high frequency component to low frequency component) due to the principle of the wavelet transform.

In contrast, on the decoder side (the synthesis filter side), the image needs to be generated and output from the low frequency component to the high frequency component in order to decode immediately with a small amount of delay. The coefficient data generated on the encoder side is preferably rearranged in a direction from the low frequency component to the high frequency component and then supplied to the decoder side.

This arrangement is described more specifically with reference to FIG. 15. The synthesis filter for performing the inverse wavelet transform is illustrated on the right side of FIG. 15. A first synthesizing process for the first line and other lines of the output image data (inverse wavelet transform) is performed using the coefficient C4 and the coefficient C5 of the low frequency component generated in the first filtering operation on the encoder side and the coefficient C1.

More specifically, in the first synthesis process, the encoder side supplies the decoder side with the coefficient data in the order of the coefficient C5, the coefficient C4 and the coefficient C1. The decoder side performs the synthesis process on the coefficient C5 and the coefficient C4 in a synthesis level=2 corresponding to segmentation level=2, thereby generating and storing a coefficient $C_f$. In a synthesis level=1 corresponding to the segmentation level=1, the synthesis process is performed on the coefficient $C_f$ and the coefficient C1 and the synthesis result is output as a first line.

In the first synthesis process, the coefficient data, generated and stored on the coefficient rearranging memory 14 in the order of the coefficient C1, the coefficient C2, the coefficient C3, the coefficient C4 and the coefficient C5, is rearranged in the order of the coefficient C5, the coefficient C4, the coefficient C1, . . . , and then supplied to the decoder side.

As for synthesis filter illustrated on the right side of FIG. 15, the coefficient supplied from the encoder side has a parenthesized number on the encoder side, and an unparenthesized number indicating a line number in the synthesis filter. For example, the coefficient C1(5) means the coefficient C5 on the analysis filter on the left side in FIG. 15 and the first line in the synthesis filter side.

The synthesis process of the decoder side is performed on the coefficient data processed in the second and subsequent filtering operations on the encoder side using the coefficient data synthesized in the preceding synthesis process or supplied from the encoder side. As shown in FIG. 15, the second synthesis process of the decoder side to be performed using the coefficient C8 and the coefficient C9 of the low frequency component generated in the second filtering operation on the encoder side further needs the coefficient C2 and the coefficient C3 generated in the first filtering operation on the encoder side. The second line through the fifth line are thus decoded.

In the second synthesis process, the encoder side supplies to the decoder side the coefficient data in the order of the coefficient C9, the coefficient C8, the coefficient C2, and the coefficient C3. The decoder side generates a coefficient $C_g$ in the process of synthesis level=2 using the coefficient C8 and the coefficient C9 and the coefficient C4 supplied from the encoder side at the first synthesis process, and stores the coefficient $C_g$ on the buffer. The decoder side generates a coefficient $C_h$ using the coefficient $C_g$, the coefficient C4, and the coefficient $C_f$ generated in the first synthesis process and stored on the buffer, and then stores the coefficient $C_h$ on the buffer.

The decoder side performs the synthesis process of synthesis level=1 using the coefficient $C_g$ and the coefficient $C_h$ generated in the synthesis process of synthesis level=2 and stored on the buffer, the coefficient C2 (referred to as a coefficient C6(2) in the synthesis filter) and the coefficient C3 (referred to as a coefficient C7(3) in the synthesis filter) supplied from the encoder side. The decoder side thereby decodes the second line through the fifth line.

In the second synthesis process, the coefficient data generated on the encoder side in the order of the coefficient C2, the coefficient C3, (the coefficient C4 and the coefficient C5), the coefficient C6, the coefficient C7, the coefficient C8, and the coefficient C9 is rearranged in the order of the coefficient C9, the coefficient C8, the coefficient C2, the coefficient C3, . . . before being transferred to the decoder side.

In the third and subsequent synthesis analysis processes, the coefficient data stored on the coefficient rearranging memory 14 is also rearranged and then transferred to the decoder side. The decoder side decodes the lines with four lines at a time.

In a synthesis process on the decoder side responsive to the filtering operation for the other lines including the bottom line on the screen on the encoder side (hereinafter referred to as final filtering operation), the coefficient data generated and stored heretofore on the buffer in the preceding processes is all output. The number of output lines becomes large. As shown in FIG. 15, eight lines are output at the final process.

The memory controller 13 may rearrange the coefficient data by setting, in a predetermined order, read addresses in the reading of the coefficient data stored on the coefficient rearranging memory 14.

Figure 16A:
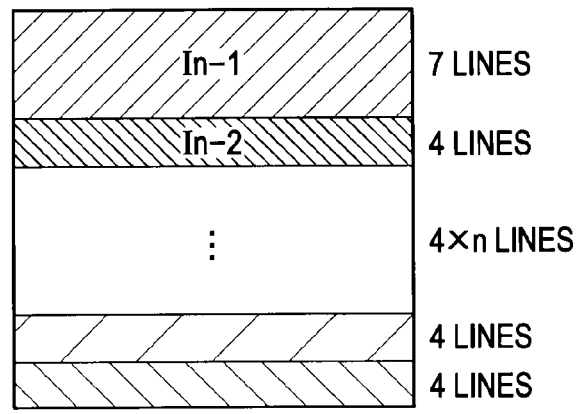
FIGS. 16A-16C diagrammatically illustrate a process flow of the wavelet transform and inverse wavelet transform in accordance with one embodiment of the present invention.
Figure 16B:
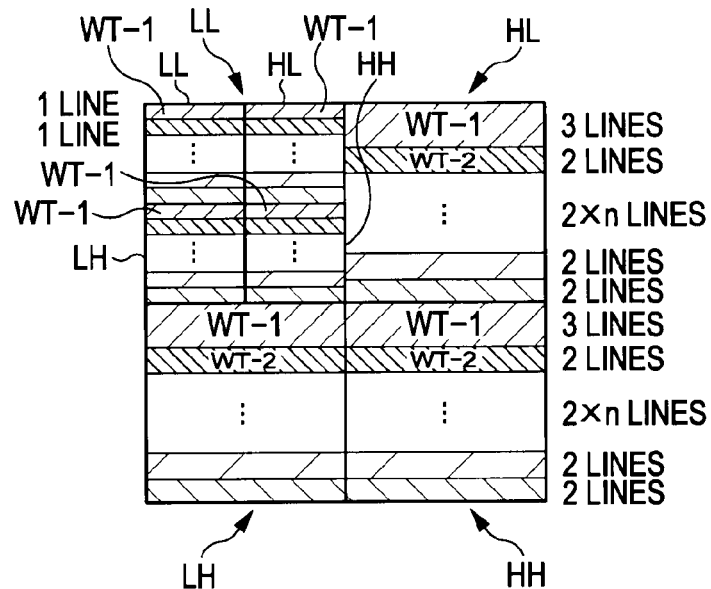
Figure 16C:
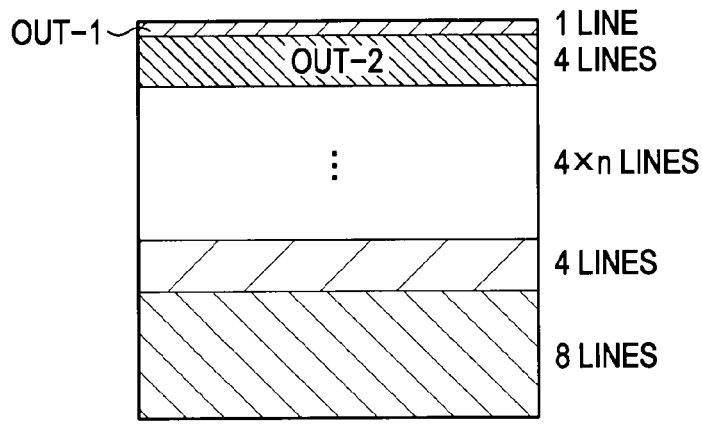

The above-referenced process is specifically described with reference to FIGS. 16A-16C. FIGS. 16A-16C illustrate a wavelet transform filtering operation to segmentation level=2 using the 5×3 filter. As shown in FIG. 16A, the wavelet transformer 11 performs the first filtering operation on the input image data of the first line to the seventh line in the horizontal direction and the vertical direction (In-1 in FIG. 16A).

In the first filtering operation of segmentation level=1, the coefficient data of three lines including the coefficient C1, the coefficient C2 and the coefficient C3 is generated, and arranged in the region HH, the region HL, and the region LH formed at segmentation level=1 as shown in FIG. 16B (WT-1 in FIG. 16B).

The region LL formed at segmentation level=1 is further segmented into four regions in the filtering operation of segmentation level=2 in the horizontal direction and the vertical direction. As for the coefficient C5 and the coefficient C4 generated at segmentation level=2 and arranged in the region LL of segmentation level=1, one line of the coefficient C5 is arranged in the region LL, and one line of the coefficient C4 is arranged in each of the region HH, the region HL, and the region LH.

In the second and subsequent filtering operations by the wavelet transformer 11, each filtering operation is performed on four lines at a time (In-2 in FIG. 16A), two lines of coefficient data are generated at a time at segmentation level=1 (WT-2 of FIG. 16B), and one line of coefficient data is generated at segmentation level=2.

In the second process of FIG. 15, two lines of coefficient data of the coefficient C6 and the coefficient C7 are generated in the filtering operation of segmentation level=1, and arranged subsequent to the coefficient data generated in the first filtering operation in the region HH, the region HL, and the region LH formed at segmentation level=1 as shown in FIG. 16B. Similarly, in the region LL of segmentation level=1, one line of coefficient C9 generated in the filtering operation of segmentation level=2 is arranged in the region LL, one line of coefficient C8 is arranged in each of the region HH, the region HL and the region LH.

When the wavelet transformed data is decoded as shown in FIG. 16B, the decoder side performs the first synthesis process in response to the first filtering operation of the encoder side on the first line through the seventh line, thereby outputting the first line (Out-1 of FIG. 16C). The decoder side outputs four lines at a time in response to the filtering operation of the encoder side from the second to the final filtering operation (Out-2 . . . of FIG. 16C). In response to the final round of filtering operation on the encoder side, the decoder side outputs eight lines.

FIG. 17 illustrates a concept of the parallel operations of the elements of the encoding apparatus 1 and the decoding apparatus 101. FIG. 17 corresponds to FIGS. 16A-16C. As shown in FIG. 17, the quantization process and the entropy encoding process is collectively represented as an entropy encoding process, and the entropy decoding process and the dequantization process are collectively represented as an entropy decoding process.

The wavelet transformer 11 performs a first wavelet transform WT-1 on input In-1 (B of FIG. 17) of the image data (A of FIG. 17). With reference to FIG. 15, the first wavelet transform WT-1 starts in response to the inputting of three lines and a coefficient C1 is generated. A delay time of three lines is caused from the input of the image data In-1 to the start of the wavelet transform WT-1.

When the first wavelet transform is completed with the input image wavelet transformed, a second wavelet transform WT-2 starts.

The memory write controller 23 performs a rearrangement order Ord-1 on the coefficient C1, the coefficient C4 and the coefficient C5 in parallel with the input of the image data In-2 to be used in the second wavelet transform WT-2 and the process of the second wavelet transform WT-2 (C of FIG. 17).

The delay time between the end of the wavelet transform WT-1 and the start of the rearrangement Ord-1 includes delays of apparatuses and system structure, such as a delay caused in the transfer of a control signal to instruct the memory write controller 23 to perform a rearrangement process, a delay involved in the start of the rearrangement process by the memory write controller 23, and a delay in program processing. These delay times are not essential in the encoding process.

The coefficient data is read from the coefficient rearranging memory 14 and supplied to each of the quantizer 15 and the VLC unit 16. An entropy encoding operation EC-1 is then performed (D of FIG. 17). The entropy encoding process EC-1 can be started without waiting for the end of the rearrangement of the three coefficients, namely, the coefficient C1, the coefficient C4 and the coefficient C5. For example, when the rearrangement of one line of the first output coefficient C5 is completed, the entropy encoding can be started on the coefficient C5. The delay from the start of the rearrangement Ord-1 to the start of the entropy encoding EC-1 is one line.

The encoded data, on which the quantizer 15 and the VLC unit 16 have completed the entropy encoding EC-1, is transmitted to the decoding apparatus 101 via a transmission line (E of FIG. 17). A transmission path of the encoded data may be a communication network such as the Internet. In such a case, the encoded data is transmitted in accordance with Internet Protocol (IP). The transmission path is not limited to the IP. The transmission path may be one of communication interfaces defined by the universal serial bus (USB), and the Institute Electrical and Electronics Engineers 1394 (IEEE 1394) standard, and a wireless communication path complying with IEEE 801.11.

The encoding apparatus 1 receives successively the image data to the bottom line of the screen in succession to the seven lines of the image data input for the first process. In response to the input In-n (n is 2 or greater) of the image data, the encoding apparatus 1 performs the wavelet transform WT-n, the rearrangement Ord-n, and entropy encoding EC-n for four lines at a time as described above. The rearrangement Ord and the entropy encoding EC performed by the encoding apparatus 1 at the final process are performed on six lines. These processes are performed in parallel as shown in A of FIG. 17 through D of FIG. 17.

The data entropy encoded in EC-1 by the encoding apparatus 1 is transmitted to the decoding apparatus 101 via the transmission line, and then supplied to the VLD unit 111. The VLD unit 111 and the dequantizer 112 perform successively entropy decoding iEC-n on the data encoded in the entropy encoding EC-n, thereby restoring the coefficient data (F of FIG. 17). The restored coefficient data is successively stored on the coefficient buffer 113. When the coefficient data sufficient to perform the inverse wavelet transform is stored on the coefficient buffer 113, the inverse wavelet transformer 114 reads the coefficient data from the coefficient buffer 113, and performs the inverse wavelet transform iTW-1 on the read coefficient data (G of FIG. 17).

As described with reference to FIG. 15, the inverse wavelet transformer 114 can start the inverse wavelet transform iWT-1 when the coefficient C4 and the coefficient C5 are stored on the coefficient buffer 113. The delay time from the start of the decoding iEC-1 by the VLD unit 111 to the start of the inverse wavelet transform iWT-1 by the inverse wavelet transformer 114 is 2 lines.

When the inverse wavelet transformer 114 completes the inverse wavelet transform iWT-1 on the three lines processed in the first wavelet transform, the image data generated in the inverse wavelet transform iWT-1 is output as Out-1 (H of FIG. 17). The output Out-1 is the first line of image data as described with reference to FIGS. 15 and 16.

The decoding apparatus 101 receives successively the coefficient data encoded in the entropy encoding EC-1 (n is 2 or greater) in succession to the three lines of coefficient data encoded in the first process by the encoding apparatus 1. As described above, the decoding apparatus 101 performs the entropy decoding iEC-n and the inverse wavelet transform iWT-n on four lines of input coefficient data at a time and outputs the image data Out-n decoded in the inverse wavelet transform iWT-n. The encoding apparatus 1 performs the entropy decoding iEC and the inverse wavelet transform iWT as the final process on six lines. The encoding apparatus 1 outputs Out on eight lines. These processes are also performed in parallel by the decoding apparatus 101 as shown in F of FIG. 17 and H of FIG. 17.

As described above, the encoding apparatus 1 and the decoding apparatus 101 perform the processes thereof from top to bottom on the screen in order, and the image compression process and the image decoding process are thus performed with short delay.

The delay time from image input to image output in the wavelet transform performed to segmentation level=2 using the 5×3 filter is calculated with reference to FIG. 17. The delay time from the input of the first line of image data to the encoding apparatus 1 to the output of the first line of image data from the decoding apparatus 101 is a sum of factors described below. Delays different from system structure to system structure, such as a delay in the transmission line and a delay in actual process timing of elements in the apparatus, are excluded from the factors.

(1) Delay D_WT from the input of the first line to the end of the wavelet transform WT-1 performed on the seven lines, (2) Time D_Ord involved in the counting and the rearrangement of the three lines, (3) Time D_EC for the entropy encoding EC-1 on the three lines, (4) Time D_iEC for the entropy decoding iEC-1 on the three lines, (5) Time D_iWT for the inverse wavelet transform iWT-1 on the three lines.

The delays in the factors listed above are calculated with reference to FIG. 17. (1) Delay D_WT is for 10 lines. (2) time D_Ord, (3) time D_EC, (4) time D_iEC, and (5) time D_iWT are those for the three lines. One line after the start of the rearrangement Ord-1, the encoding apparatus 1 starts the entropy encoding EC-1. Similarly, two lines after the start of the entropy decoding iEC-1, the decoding apparatus 101 starts the inverse wavelet transform iWT-1. The entropy decoding iEC-1 can be started at the moment the encoding of the one line ends in the entropy encoding EC-1.

As shown in FIG. 17, the delay time from the input of the first line of coefficient data to the encoding apparatus 1 to the output of the first line of image data from the decoding apparatus 101 is 17 lines=10+1+1+2+3.

The delay time is further specifically described. If the input image data is an HDTV (High Definition Television) interlace video signal, one frame has a resolution of 1920 pixels×1080 lines, and one field has a resolution of 1920×540 lines. With a frame frequency of 30 Hz, the encoding apparatus 1 receives one field of 540 lines for 16.67 ms (1 s/60 fields).

The delay time involved in the input of seven lines of data is 0.216 ms (=16.67 ms×7/540 lines), and extremely short with respect to update time of one field. The sum of (1) delay D_WT, (2) time D_Ord, (3) time D_EC, (4) time D_iEC, and (5) time D_iWT is short because the number of lines to be processed is small. If the elements performing each process are implemented using hardware, the process time is further shortened.

The above-described method steps may be executed using software or hardware. The above-described software programs can be performed by any apparatus. For example, a personal computer 200 of FIG. 18 may perform the above-described software programs.

Figure 18:
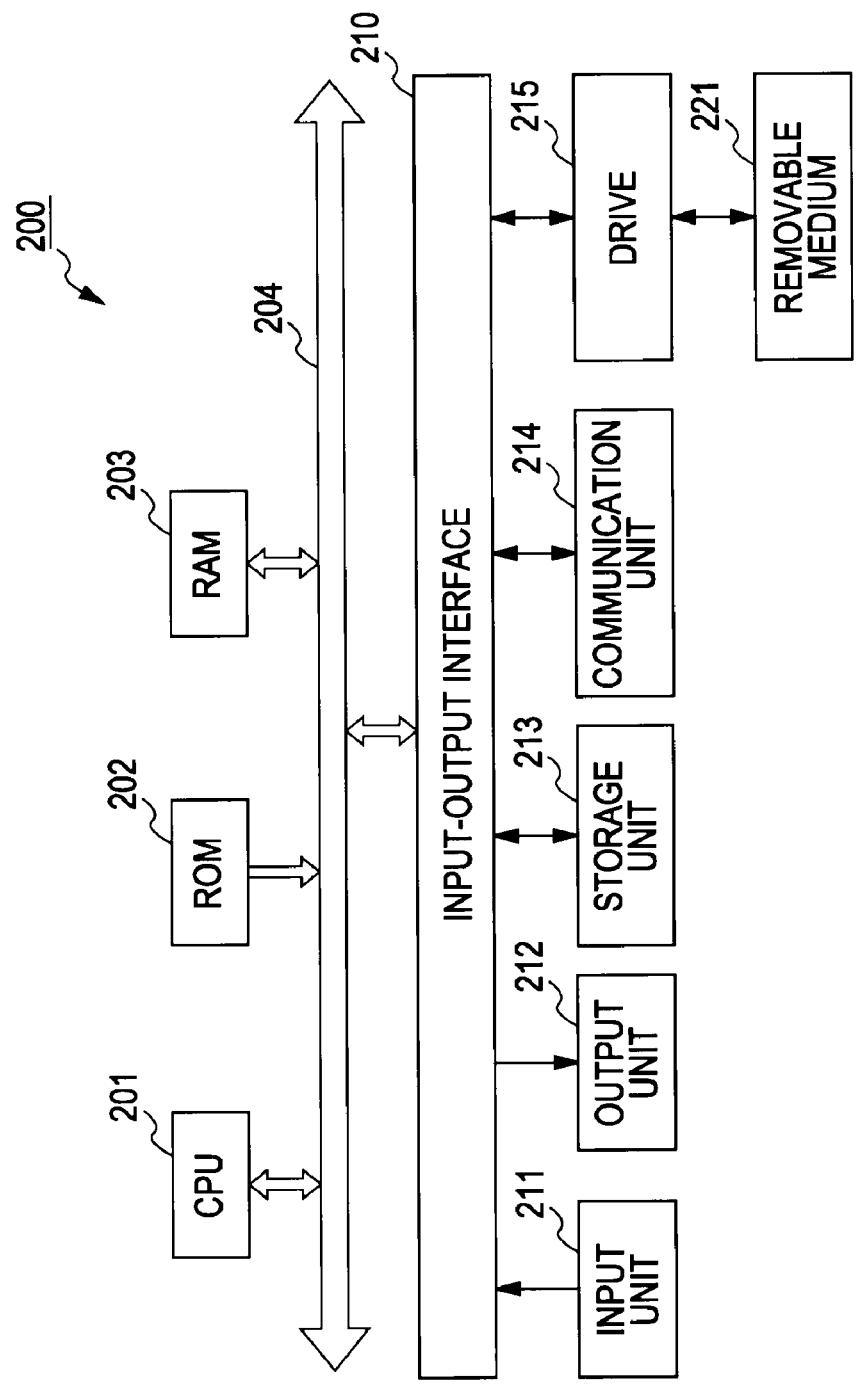
FIG. 18 illustrates a personal computer.

A CPU 201 in the personal computer 200 of FIG. 18 performs a variety of processes in accordance with a program stored on a read-only memory (ROM) 202 or a program loaded onto a random-access memory (RAM) 203 from a storage unit 213. The RAM 203 stores, as necessary, data used for the CPU 201 to perform a variety of processes.

The CPU 201, the ROM 202 and the RAM 203 are connected to each other via a bus 204. The bus 204 connects to an input-output interface 210.

Also connected to the input-output interface 210 are an input unit 211 including a keyboard and a mouse, an output unit 212 including a display such as a cathode ray tube (CRT) or a liquid-crystal display (LCD) and a loudspeaker, a storage unit 213 including a hard disk, and a communication unit 214 including a modem. The communication unit 214 performs a communication process via a network such as the Internet.

The input-output interface 210 also connects to a drive 215, as necessary. A removable medium 221, such as one of a magnetic disk, an optical disk, a magneto-optical disk, and a semiconductor memory, is loaded on the drive 215. A computer program read from the removable medium 221 is installed onto the storage unit 213.

If the above-described series of method steps are performed using software, a program implementing the software is installed via the network or from a recording medium.

The recording medium may be the removable medium 221 of FIG. 18, storing the program and distributed separately from the host apparatus to supply the user with the program. The removable medium 221 may include one of a magnetic disk (including a flexible disk), an optical disk (compact-disk read-only memory (CD-ROM), a digital versatile disk (DVD) or the like), a magneto-optical disk (Mini-Disk (MD)®), and a semiconductor memory. The recording medium may also be one of the ROM 202 and a hard disk loaded onto the storage unit 213, each storing the program and supplied in the host apparatus to the user.

The above-described method steps describing the program recorded on the recording medium may be performed in the time-series sequence described above. Also, the above-described method steps may be performed in parallel or separately.

The word system refers to an entire apparatus composed a plurality of devices.

The apparatus described as a single unit may be divided into a plurality of apparatuses. Apparatuses described a plurality of units may be integrated into a single unit. Another arrangement may be attached to the structure of the above-described apparatus. If the structure and operation of the system remain unchanged, part of one apparatus may be integrated into another apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An image data processing apparatus, comprising:
a memory for storing coefficient data obtained in an order from a high-frequency component to a low-frequency component by performing a wavelet transform on image data;
calculation means for calculating a memory address of the memory storing the coefficient data, based on an encoding parameter of the image data and an amount of data of the coefficient data;
memory area reservation means for reserving a memory area where the coefficient data is to be written, in accordance with the memory address calculated by the calculation means; and
write means for rearranging the coefficient data in an order of an inverse wavelet transform and for writing the rearranged coefficient data onto the memory area reserved by the memory area reservation means such that coefficient data of a low-frequency subband is stored adjacent to a head portion.

2. The image data processing apparatus according to claim 1, wherein the memory area reservation means reserves the memory area of the coefficient data by lineblock, each lineblock being image data of lines to generate one line of the coefficient data in a lowest-frequency subband.

3. The image data processing apparatus according to claim 1, wherein the memory area reservation means reserves the memory area to write the coefficient data so that the coefficient data of the low-frequency subband is arranged at a leading position of the memory address and so that the coefficient data of a high-frequency component is arranged at a trailing position of the memory address.

4. The image data processing apparatus according to claim 1, further comprising:
read means for reading the coefficient data, written on the memory by the write means, in an order from a low-frequency component to a high-frequency component.

5. The image data processing apparatus according to claim 1, further comprising:
read means for reading the coefficient data, written on the memory by the write means, in an order from a leading address.

6. The image data processing apparatus according to claim 1, further comprising:
acquisition means for acquiring the encoding parameter of the image data.

7. The image data processing apparatus according to claim 1, wherein the encoding parameter includes a horizontal size of input image data and a number of vertical lines of the input image data.

8. The image data processing apparatus according to claim 1, wherein the encoding parameter includes a bit accuracy.

9. The image data processing apparatus according to claim 1, wherein the encoding parameter includes a segmentation level of the wavelet transform.

10. An image data processing method, comprising:
storing coefficient data obtained in an order from a high-frequency component to a low-frequency component by performing a wavelet transform on image data;
calculating a memory address of a memory storing the coefficient data, based on an encoding parameter of the image data and an amount of data of the coefficient data;
reserving a memory area where the coefficient data is to be written, in accordance with the calculated memory address; and
rearranging the coefficient data in an order of an inverse wavelet transform, and writing the rearranged coefficient data onto the reserved memory area such that coefficient data of a low-frequency subband is stored adjacent to a head portion.

11. An image data processing apparatus, comprising:
a memory that stores coefficient data obtained in an order from a high-frequency component to a low-frequency component by performing a wavelet transform on image data;
a calculation unit that calculates a memory address of the memory storing the coefficient data, based on an encoding parameter of the image data and an amount of data of the coefficient data;
a memory area reservation unit that reserves a memory area where the coefficient data is to be written, in accordance with the memory address calculated by the calculation unit; and
a write unit configured to rearrange the coefficient data in an order of an inverse wavelet transform and to write the rearranged coefficient data onto the memory area reserved by the memory area reservation unit such that coefficient data of a low-frequency subband is stored adjacent to a head portion.

12. The image data processing apparatus according to claim 1, wherein the wavelet transform is performed with a low frequency filter $H_0(z)$ and a high frequency filter $H_1(z)$, where $$H_0(z)=(-1+2z^{-1}+6z^{-2}+2z^{-3}-z^{-4})/8, \text{ and}$$

$$H_1(z)=(-1+2z^{-1}-z^{-2})/2.$$

13. The image data processing apparatus according to claim 1, wherein the calculation means calculates the memory address based on a bit accuracy, a segmentation level of the wavelet transform, and a product of a horizontal size and a number of vertical lines.

14. The image data processing apparatus according to claim 11, further comprising:
a memory read controller that reads the coefficient data in an order starting with the head portion and ending with a trailing address;
a quantizer that quantizes the coefficient data on a line-by-line basis; and
a variable-length coding unit that entropy encodes quantization coefficients on a line-by-line basis.

* * * * *